(12) United States Patent
Miyadera et al.

(10) Patent No.: US 8,471,881 B2
(45) Date of Patent: Jun. 25, 2013

(54) IMAGE FORMING APPARATUS AND IMAGE FORMING METHOD USING THE APPARATUS

(75) Inventors: Tatsuya Miyadera, Osaka (JP); Kunihiro Komai, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 13/044,722

(22) Filed: Mar. 10, 2011

(65) Prior Publication Data

US 2011/0229172 A1    Sep. 22, 2011

(30) Foreign Application Priority Data

Mar. 17, 2010    (JP) .................................. 2010-060193

(51) Int. Cl.
*B41J 2/435*  (2006.01)
*B41J 2/47*   (2006.01)

(52) U.S. Cl.
USPC ............................ 347/234; 347/229; 347/248

(58) Field of Classification Search
USPC ................. 347/229, 230, 234, 235, 241, 242, 347/245, 248–250, 256, 257, 263, 116
See application file for complete search history.

(56) References Cited

U.S. PATENT DOCUMENTS

| | | | | |
|---|---|---|---|---|
| 7,436,425 | B2 * | 10/2008 | Yamazaki et al. | 347/244 |
| 7,593,028 | B2 * | 9/2009 | Kimura | 347/234 |
| 7,791,628 | B2 * | 9/2010 | Miyadera | 347/234 |
| 2008/0038024 | A1 | 2/2008 | Miyadera | |
| 2008/0069602 | A1 | 3/2008 | Miyadera | |
| 2008/0170868 | A1 | 7/2008 | Miyadera | |
| 2008/0212986 | A1 | 9/2008 | Miyadera | |
| 2009/0074476 | A1 | 3/2009 | Miyadera | |
| 2009/0161142 | A1 | 6/2009 | Miyadera | |
| 2009/0185816 | A1 | 7/2009 | Miyadera | |
| 2009/0190940 | A1 | 7/2009 | Miyadera | |
| 2009/0196636 | A1 | 8/2009 | Miyadera | |
| 2009/0220878 | A1 | 9/2009 | Miyadera | |

FOREIGN PATENT DOCUMENTS

| | | | |
|---|---|---|---|
| JP | 62153916 A | * | 7/1987 |
| JP | 2642351 | | 8/1997 |
| JP | 2858735 | | 2/1999 |
| JP | 2005-221824 | | 8/2005 |
| JP | 2008-040238 | | 2/2008 |
| JP | 2008-076534 | | 4/2008 |
| JP | 2008-170736 | | 7/2008 |
| JP | 2008-170737 | | 7/2008 |
| JP | 2008-225163 | | 9/2008 |
| JP | 2009-069767 | | 4/2009 |
| JP | 2009-157056 | | 7/2009 |
| JP | 2009-169397 | | 7/2009 |

(Continued)

*Primary Examiner* — Hai C Pham
(74) *Attorney, Agent, or Firm* — IPUSA, PLLC

(57) ABSTRACT

An apparatus to form plural images on an image conveyor includes plural photoconductor bodies, a light exposure device, a development device, a transfer device, and a pattern detection device, wherein the light exposure device includes an optical scanning part, a first light detection part having a first light receiving face, a second light detection part having a second light receiving face being non-parallel to the first light receiving face, a third light detection part having a third light receiving face being non-parallel to the first light receiving face, the optical scanning part, the first light detection part, and the second light detection part being provided inside a housing of the light exposure device, the third light detection part being provided outside the housing, and a light exposure timing control device.

5 Claims, 14 Drawing Sheets

FOREIGN PATENT DOCUMENTS

| | | |
|---|---|---|
| JP | 2009-193062 | 8/2009 |
| JP | 2009-205147 | 9/2009 |
| JP | 2009-226930 | 10/2009 |
| JP | 2010-175833 | 8/2010 |
| JP | 2010-181570 | 8/2010 |

* cited by examiner

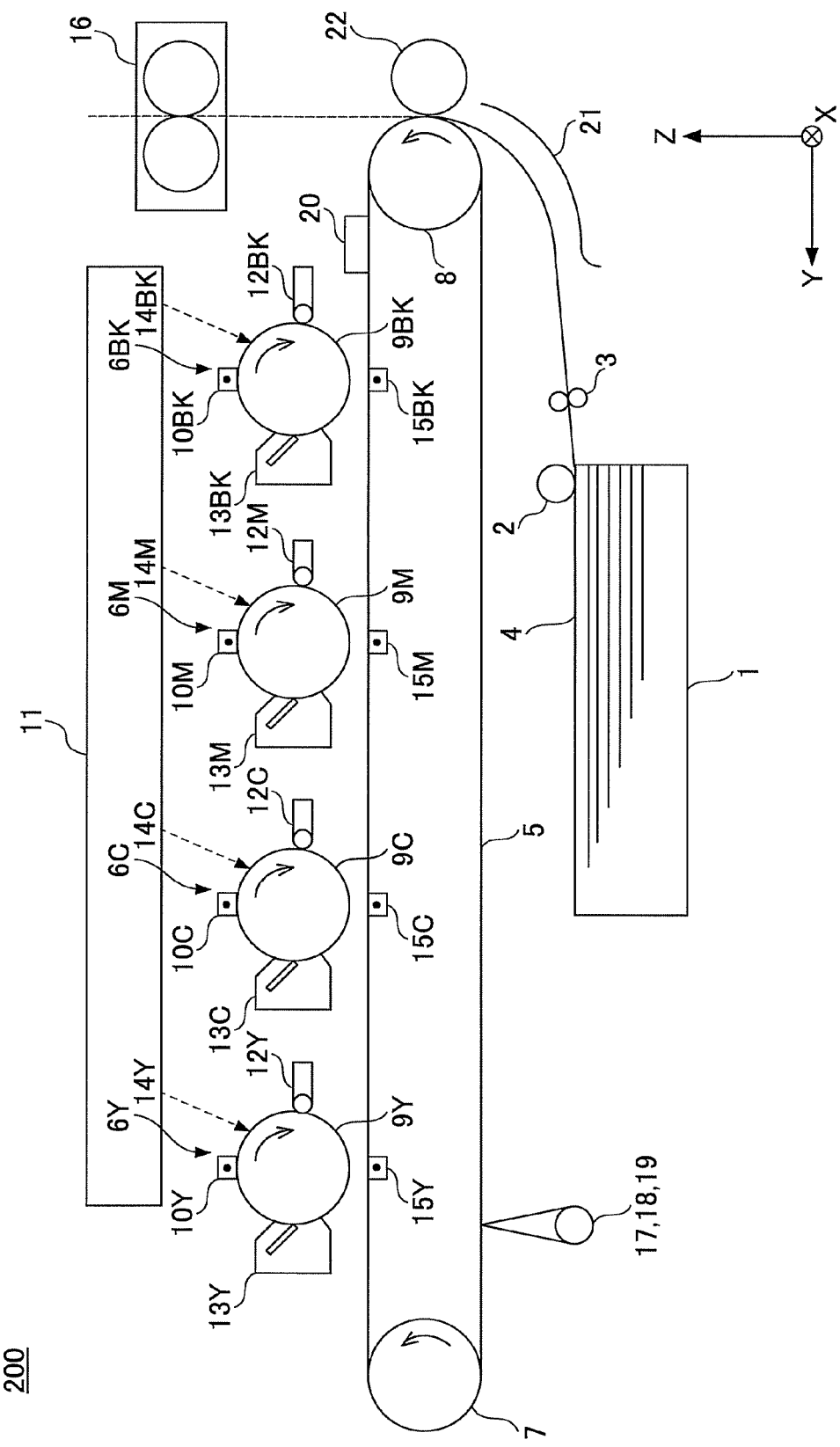

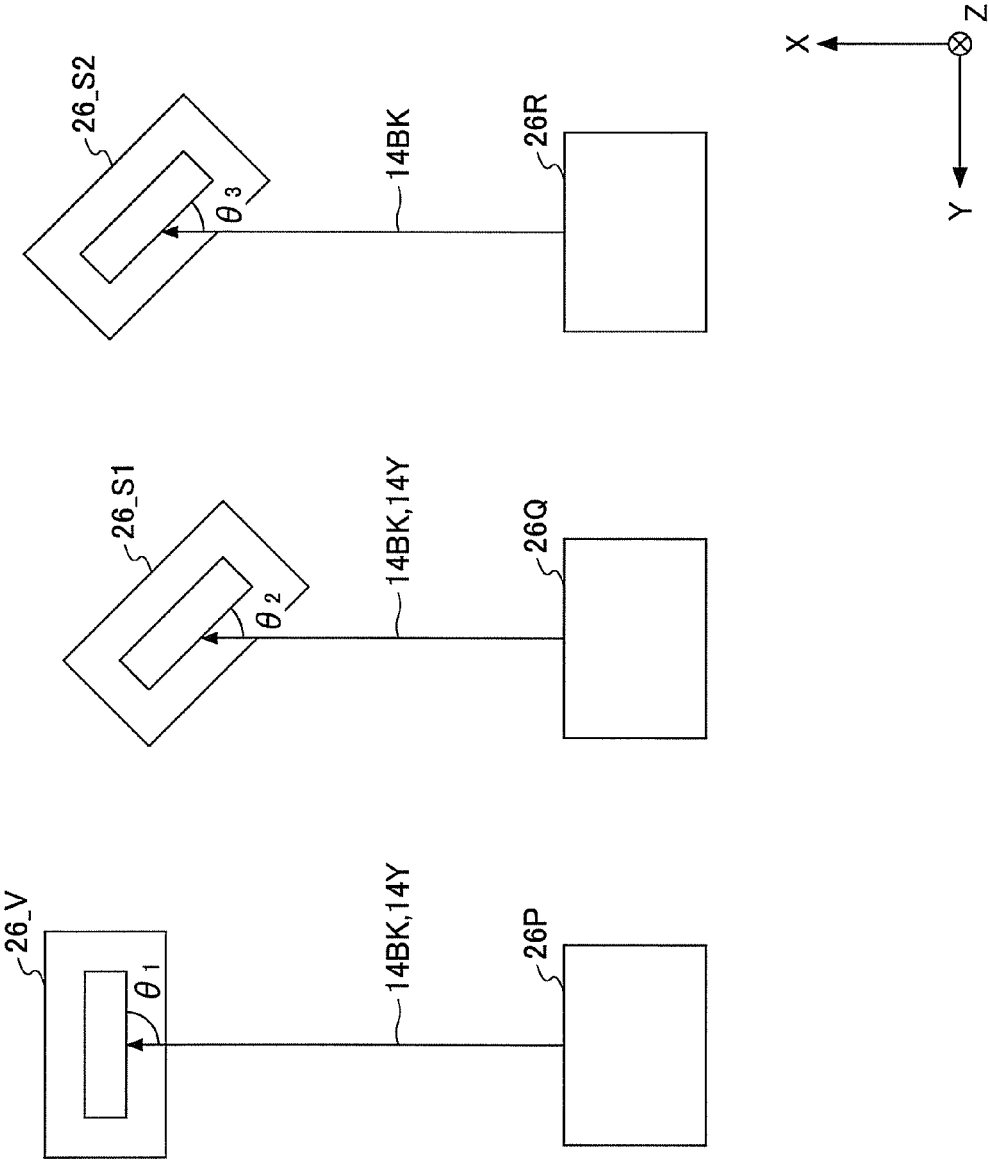

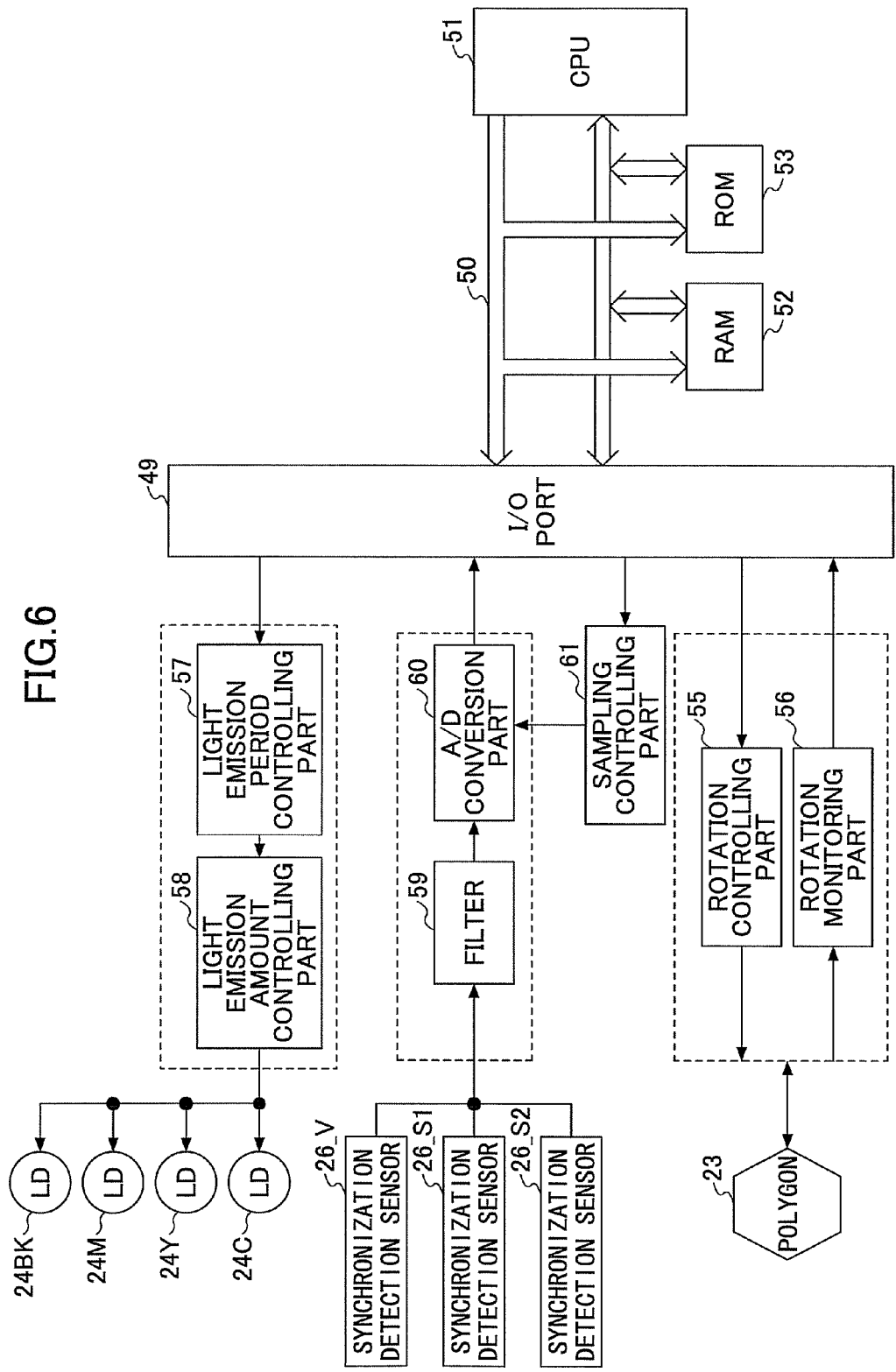

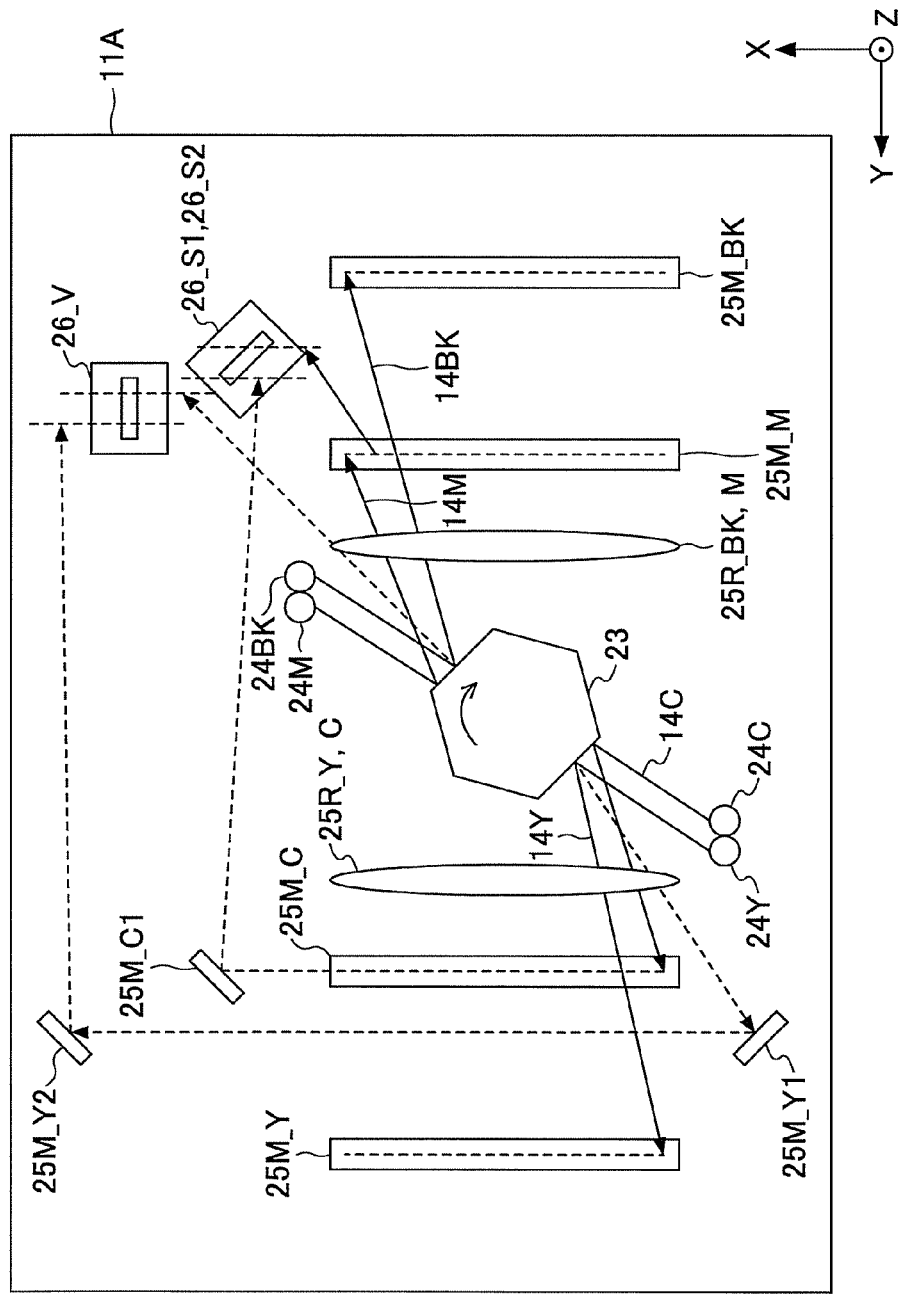

IMAGE FORMING APPARATUS AND IMAGE FORMING METHOD USING THE APPARATUS

BACKGROUND OF THE INVENTION

1. Field of the Invention

One aspect of the present invention relates to at least one of an image forming apparatus and an image forming method using the apparatus.

2. Description of the Related Art

An image forming apparatus is known which is represented by a tandem-type laser beam printer. In such an image forming apparatus, image forming parts that are all different from one another with respect to four colors (black, magenta, yellow, and cyan) and a light exposure device for emitting an exposure light beam for the color of an image formed by each image forming part are used to overlay toner images on a paper sheet directly or on an intermediate transfer belt, thereby forming a color image. Herein, a light exposure device of an image forming apparatus according to a related art will be illustrated.

FIG. 1A is a plan view illustrating a principal configuration inside a light exposure device of an image forming apparatus according to a related art. FIG. 1B is a side view illustrating a principal configuration inside a light exposure device of an image forming apparatus according to a related art. As referring to FIG. 1A and FIG. 1B, laser light beams 140BK, 140M, 140C, and 140Y as exposure light beams of respective colors are emitted from laser diodes 240BK, 240M, 240C, and 240Y as light sources, respectively, in a light exposure device 110. The emitted laser light beams 1408K, 140M, 1400, and 140Y are reflected from a reflecting mirror 230, pass through f-θ lenses 250R for adjusting a main scanning magnification and folding mirrors 250M provided for the respective colors to adjust the light paths thereof, and subsequently scan faces to be scanned which are surfaces of photoconductor drums (not illustrated). Herein, BK, M, Y, and C behind hyphens provided for 250R and 250M indicate optical systems for black, magenta, yellow, and cyan colors, respectively.

The reflecting mirror 230 is a hexahedral polygon mirror and is capable of rotating so as to conduct a scanning operation of one line with an exposure light beam in a main scanning direction per one face of the polygon mirror. Scanning is conducted by one polygon mirror for four laser diodes as light sources. The exposure light beams are divided into two set of colors, laser light beams 1408K and 140M and laser light beams 140C and 140Y, and opposing reflecting faces of the reflecting mirror (polygon mirror) 230 are used to conduct scanning, whereby it is possible to conduct simultaneous light exposure for four different photoconductor drums (not illustrated).

A synchronization detection sensor 260 is arranged outside an imaging area in a main scanning direction, detects the laser light beams 140BK and 140Y for each scanning operation of one line, and adjusts the timing of start of light exposure for image formation. The synchronization detection sensor 260 is arranged at the side of the f-θ lens 250R-BK, and hence, the laser light beam 140Y is incident on the synchronization detection sensor 260 via the folding mirrors for synchronization detection 250M-Y1 and 250M-Y2. The laser light beams 140M and 140C are not capable of adjusting the timing of writing by a synchronization detection sensor, and hence, the timing of start of light exposure for magenta and the timing of the start of light exposure for cyan coincide with the timing of start of light exposure for black and the timing of start of light exposure for yellow, respectively, thereby adjusting the positions of images of the respective colors.

Meanwhile, if the positions of overlaid toner images of the respective colors are displaced subtly, it may be impossible to obtain a color image stably. Hence, a pattern for positional displacement correction is formed for each color in an image forming apparatus according to a related art and the positions of toner images of the respective colors are detected by a detection device such as a TM sensor (toner marking sensor), thereby conducting positional displacement correction to overlay all the four colors at an identical position.

When positional displacement correction is conducted, four color images may generally overlay at an identical position and the amount of color displacement may approach zero. However, as time has passed after conducting positional displacement correction, the amount of color displacement may increase due to various factors. In particular, displacement of the position of a reflecting mirror due to a temperature rise inside a light exposure device may often be a main factor of an increase in the amount of color displacement. Although a reflecting mirror is fixed by using a screw or an adhesive material in a light exposure device, the shape thereof may be changed or the shape of a supporting member may be changed with a temperature rise, and hence, the inclination thereof with respect to the light path of an emitted light beam may be changed readily. Due to such a change in the inclination, the amount of color displacement may increase.

In order to correct an increased amount of color displacement, it may be necessary to conduct positional displacement correction in which a pattern for positional displacement correction is image-made and detected. However, a time period of 10-20 seconds may usually be required to conduct positional displacement correction and such a time period may be down time for a user.

For a method for reducing such a time period to conduct positional displacement correction, a PD with a non-parallel shape may be used as a sensor (synchronization detection sensor) for adjusting the timing of writing in a light exposure device. A PD with a non-parallel shape has a shape that is perpendicular at one end portion and has obliqueness at the other. As a laser light beam passes through a PD with a non-parallel shape, the timing of passage through a perpendicular end portion is constant independently of the inclination of a reflecting mirror but the timing of passage through an end portion having obliqueness is changed depending on the position of an exposure light beam in a sub-scanning direction. The difference between the results of detection at such a perpendicular end portion and an end portion having obliqueness is used to calculate an amount of positional displacement of light exposure in a sub-scanning direction and an amount of sub-scanning color displacement on an image is calculated for correction from such an amount of positional displacement of light exposure (for example, see Japanese Patent No. 2858735, Japanese Patent No. 2642351, and Japanese Patent Application Publication No. 2005-221824).

However, a problem may be that a PD with a non-parallel shape as used in a related art may be expensive, and accordingly, the cost of manufacturing an image forming apparatus may be increased.

Also, it may be necessary to arrange PDs with a non-parallel shape in the light paths along which all the laser light beams of four colors are reflected from folding mirrors and reach photoconductor drums, and accordingly, a number of mirrors may be required to establish light paths of laser light beams. A problem may be that the cost of manufacturing an image forming apparatus may also be increased due to such a matter.

Also, if deformation of a light exposure device is caused due to a temperature rise inside the light exposure device or the like, a problem may be that the distances among respective PDs with a non-parallel shape may vary, whereby an amount of positional displacement of light exposure in a sub-scanning direction may not be correctly calculated and an error may be caused in a correction value for the amount of positional displacement of light exposure. In such a case, it may be impossible for a PD with a non-parallel shape to detect a deformation of a light exposure device, and hence, it may be impossible to correct an error in a correction value.

SUMMARY OF THE INVENTION

According to one aspect of the present invention, there is provided an image forming apparatus, including an image conveyor, plural photoconductor bodies, a light exposure device configured to expose the plural photoconductor bodies to plural light beams to form plural electrostatic latent images on the plural photoconductor bodies, a development device configured to develop the plural electrostatic latent images with developers to form plural images, a transfer device configured to transfer the plural images onto the image conveyor, and a pattern detection device configured to detect a pattern for correcting positional displacement of the plural images to be transferred onto the image conveyor, wherein the light exposure device includes an optical scanning part configured to scan the plural photoconductor bodies with the plural light beams in a first direction, a first light detection part having a first light receiving face configured to detect at least one of the plural light beams and be perpendicular to the first direction, a second light detection part having a second light receiving face configured to detect at least one of the plural light beams and be non-parallel to the first light receiving face, a third light detection part having a third light receiving face configured to detect at least one of the plural light beams and be non-parallel to the first light receiving face, the optical scanning part, the first light detection part, and the second light detection part being provided inside a housing of the light exposure device, the third light detection part being provided outside the housing, and a light exposure timing control device configured to control timing of light exposure of the plural photoconductor bodies to the plural light beams based on detection of at least one of the plural light beams on the first light receiving face, detection of at least one of the plural light beams on the second light receiving face, detection of at least one of the plural light beams on the third light receiving face, and detection of the pattern by the pattern detection device.

According to another aspect of the present invention, there is provided an image forming method using the apparatus as described above, including scanning the plural photoconductor bodies with plural light beams in a first direction to form plural electrostatic latent images on the plural photoconductor bodies, detecting at least one of the plural light beams on the first light receiving face in the apparatus, detecting at least one of the plural light beams on the second light receiving face in the apparatus, detecting at least one of the plural light beams on the third light receiving face in the apparatus, developing the plural electrostatic latent images with developers to form the plural images, transferring the plural images onto the image conveyor, forming a pattern for correcting positional displacement of the plural images to be transferred onto the image conveyor, detecting the pattern for correcting positional displacement of the plural images to be transferred onto the image conveyor, calculating a first set of amounts of positional displacement of the plural images to be transferred onto the image conveyor based on detection of the pattern, measuring a first time period between detection of at least one of the plural light beams on the first light receiving face and detection of at least one of the plural light beams on the second light receiving face, calculating a second set of amounts of positional displacement of the plural images to be transferred onto the image conveyor based on the first time period, measuring a second time period between detection of at least one of the plural images on the second light receiving face and detection of at least one of the plural light beams on the third light receiving face, determining timing of calculation of the first sets of amounts of positional displacement of the plural images based on the second time period, and controlling timing of light exposure of the plural photoconductor bodied to the plural light beams based on the first set of amounts of positional displacement of the plural images and the second sets of amounts of positional displacement of the plural images.

BRIEF DESCRIPTION OF THE DRAWINGS

FIG. 2 is a diagram that simply and schematically illustrates the structure of a principal part of an image forming apparatus according to a first illustrative embodiment of the present invention.

FIG. 5C is a diagram illustrating a light path of a laser light beam incident on a synchronization detection sensor.

FIG. 6 is a diagram illustrating a process for controlling a light exposure device.

FIG. 8A is a plan view illustrating a principal configuration inside a light exposure device according to a second illustrative embodiment of the present invention.

DETAILED DESCRIPTION OF THE PREFERRED EMBODIMENTS

Figure 1A:
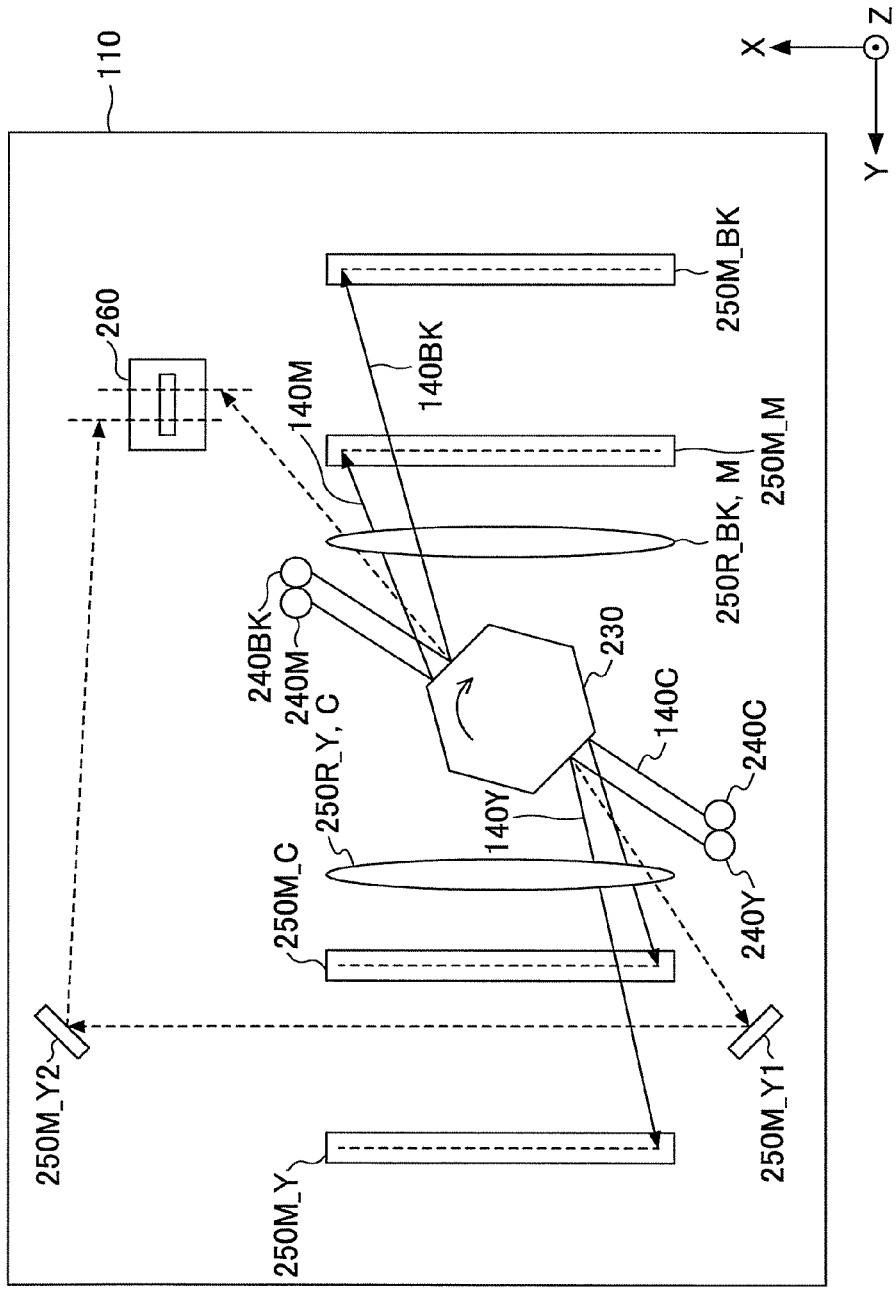
FIG. 1A is a plan view illustrating a principal configuration inside a light exposure device of an image forming apparatus according to a related art.

Some illustrative embodiments of the present invention will be described with reference to the accompanying drawings below.

First Illustrative Embodiment

[A General Structure and Operation of an Image Forming Apparatus]

First, the general structure and operation of an image forming apparatus according to a first illustrative embodiment of the present invention will be described. FIG. 2 is a diagram that simply and schematically illustrates the structure of a principal part of an image forming apparatus according to a first illustrative embodiment of the present invention. As referring to FIG. 2, an image forming apparatus 200 is a so-called tandem-type image forming apparatus configured to have image forming parts (electrophotographic process parts) of respective colors, 6BK, 6M, 6C, and 6Y, arranged along an intermediate transfer belt 5. Also, an X-direction is a main scanning direction and a Y-direction is a sub-scanning direction in FIG. 2.

The intermediate transfer belt 5 is an endless belt winding a driving roller 7 and a driven roller 8, which are driven rotationally. The driving roller 7 is rotationally driven by a driving motor (not illustrated), and the driving roller 7 and the driven roller 8 move the intermediate transfer belt 5. The intermediate transfer belt 5 is a typical example of an endless conveyor for an illustrative embodiment of the present invention.

Plural image forming parts (electrophotographic process parts) 6BK, 6M, 6C, and 6Y are arranged sequentially from an upstream side along the intermediate transfer belt 5. Such plural image forming parts 6BK, 6M, 6C, and 6Y have common internal structures so that only colors of toner images formed thereby are different from one another. The image forming part 6BK, image forming part 6M, image forming part 60, and image forming part 6Y form a black image, a magenta image, a cyan image, and an yellow image, respectively.

The image forming part 6BK is composed of a photoconductor drum 9BK and a charger 10BK, a developer 12BK, a photoconductor cleaner (not illustrated), a discharger 13BK, and the like, which are arranged around the photoconductor drum 9BK. The photoconductor drums 9BK, 9M, 9C, and 9Y are typical examples of plural image carriers for an illustrative embodiment of the present invention. The charger 10BK, the developer 12BK, the photoconductor cleaner (not illustrated), the discharger 13BK, and the like are typical examples of plural image-making devices for an illustrative embodiment of the present invention. The other image forming parts 6M, 6C, and 6Y have structures similar to the image forming part 6BK, and accordingly, only reference numerals distinguished by M, C, and Y are provided for respective components of the image forming parts 6M, 6C, and 6Y in FIG. 2 instead of BK provided for each component of the image forming part 6BK while an explanation thereof is omitted.

A light exposure device 11 has a function for scanning the photoconductor drums 9BK, 9M, 9C, and 9Y as image carriers with laser light beams 14BK, 14M, 14C, and 14Y as exposure light beams for the colors of images formed by the image forming parts 6BK, 6M, 6C, and 6Y, respectively, to conduct light exposure thereof. The light exposure device 11 is a typical example of a light exposure device for an illustrative embodiment of the present invention. Details of the light exposure device 11 will be described below.

Toner images of the respective colors transfer onto the intermediate transfer belt 5 at the positions (primary transfer positions) at which the photoconductor drums 9BK, 9M, 9C, and 9Y contact the intermediate transfer belt 5, due to operations of transfer devices 15BK, 15M, 15C, and 15Y. Due to such a transfer, toner images of the respective colors overlay on the intermediate transfer belt 5 so that a full-color image is formed.

For image formation, paper sheets 4 stored on a paper feed tray 1 are fed sequentially from the top thereof and delivered onto the intermediate transfer belt 5 by a paper feed roller 2 and a separation roller 3, and a full-color toner image transfers at the position (secondary transfer position 21) at which the intermediate transfer belt 5 contacts a paper sheet 4. A secondary transfer roller 22 is arranged at the secondary transfer position 21 and presses a paper sheet 4 against the intermediate transfer belt 5 so that an efficiency of transfer may be improved. The secondary transfer roller 22 closely contacts the secondary transfer belt 5 and has no attachment or detachment mechanism. A paper sheet 4 on which a full-color toner image has transferred is delivered to a fixation device 16. The full-color toner image transferred on the paper sheet 4 is fixed by the fixation device 16.

When a pattern for positional displacement correction 30 as described below is image-made on the intermediate transfer belt 5 and detected, the pattern for positional displacement correction 30 passes through the secondary transfer roller 22 before reaching a cleaning part 20, and herein, toner may attach to the secondary transfer roller 22. Such toner attached to the secondary transfer roller 22 may attach to a paper sheet 4 as contamination to reduce an image quality.

In order to eliminate such contamination caused by attached toner, a bias voltage is applied to the secondary transfer roller in addition to the cleaning mechanism of a cleaning blade, whereby toner is recovered. A bias voltage with the same polarity as the charge of toner is applied to the secondary transfer roller to attract the toner to the belt, and subsequently, the toner is scraped by the cleaning blade. When mixed + and − charges of toner are present, a bias voltage is oscillated between + and −. It may be possible to add a mechanism of attachment and detachment of the secondary transfer roller to such an intermediate transfer system whereby attachment of toner to the roller is eliminated, and however, a cost thereof may be increased, whereby no attachment or detachment mechanism is provided in the first illustrative embodiment. Thus, the general structure and operation of an image forming apparatus according to the first illustrative embodiment are provided above.

Additionally, a positional displacement correcting device according to an illustrative embodiment of the present invention is a part of an image forming apparatus and a typical example thereof is configured to include an endless conveyor such as the intermediate transfer belt 5, an image carrier such as the photoconductor drum 98K, an image-making device such as the developer 128K, a light exposure device such as the light exposure device 11, a light detecting device as described below, an image-making positional displacement amount calculating device as described below, a light exposure positional displacement amount calculating device as described below, and a scanning time period measuring device as described below. Additionally, the image-making positional displacement amount calculating device, light exposure positional displacement amount calculating device, and scanning time period measuring device are realized by a CPU 15 as described below or the like.

[A Pattern for Positional Displacement Correction]

Next, a pattern to correct positional displacement of a toner image will be described. In the image forming apparatus 200, one problem may be that toner images of the respective colors may not overlay at the proper position at which they should overlay, due to errors in the distances among the axes of the photoconductor drums 9BK, 9M, 9C, and 9Y, errors in the degrees of parallelization of the photoconductor drums 9BK, 9M, 9C, and 9Y, errors in the positions of folding mirrors 25M or the like set in the light exposure device 11, errors in the timings of writing of electrostatic latent images onto the photoconductor drums 9BK, 9M, 9C, and 9Y, or the like, and accordingly, positional displacement among the respective colors may be caused. Known causes of such positional displacement among the respective colors mainly include skew, registration displacement in a sub-scanning direction, an error in a magnification in a main scanning direction, registration displacement in a main scanning direction, or the like.

In order not to cause positional displacement, amounts of image-making positional displacement of toner images of the respective colors are calculated by an image-making positional displacement amount calculating device and positional displacement correction is conducted. The image-making positional displacement amount calculating device has a function of calculating amounts of image-making positional displacement of an image of each color transferred to the intermediate transfer belt 5 in a main scanning direction and sub-scanning direction by using a pattern for positional displacement correction which is image-made on the intermediate transfer belt 5. The positional displacement correction is conducted to adjust the positions of images of three colors, that is, magenta (M), cyan (C), and yellow (Y), with respect to the position of an image of black (BK). As illustrated in FIG. 2, sensors 17, 18, and 19 are provided at positions to oppose the intermediate transfer belt 5 at a downstream side of the image forming part 6Y. For example, the sensors 17, 18, and 19 are supported by one substrate so as to align in a main scanning direction (X-direction) orthogonal to a sub-scanning direction (Y-direction) that is a conveyance direction of the intermediate transfer belt 5. The sensors 17, 18, and 19 have functions of reading a pattern for positional displacement correction or the like.

Figure 1B:
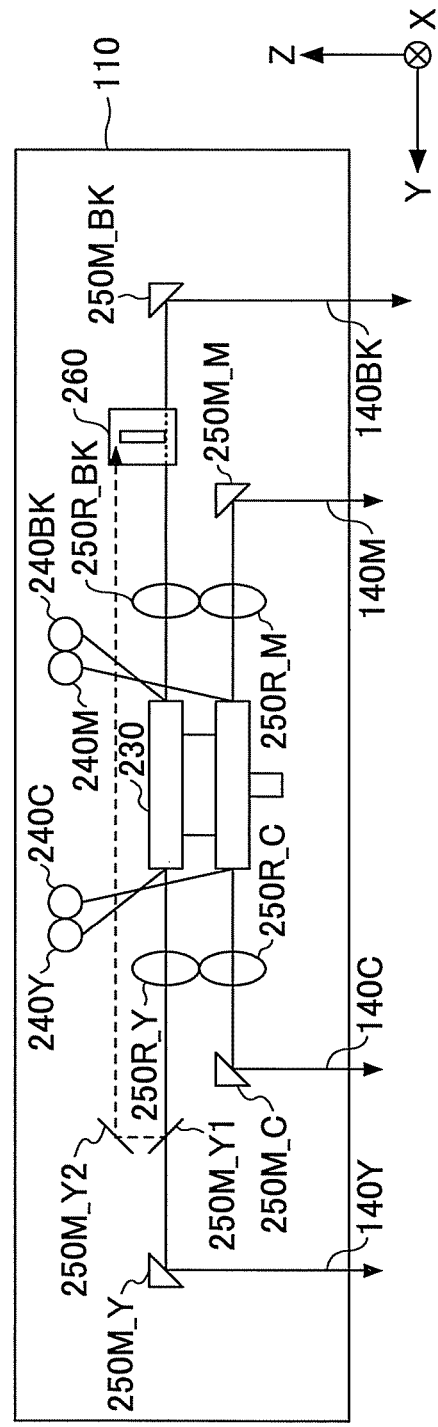
FIG. 1B is a side view illustrating a principal configuration inside a light exposure device of an image forming apparatus according to a related art.
Figure 3:
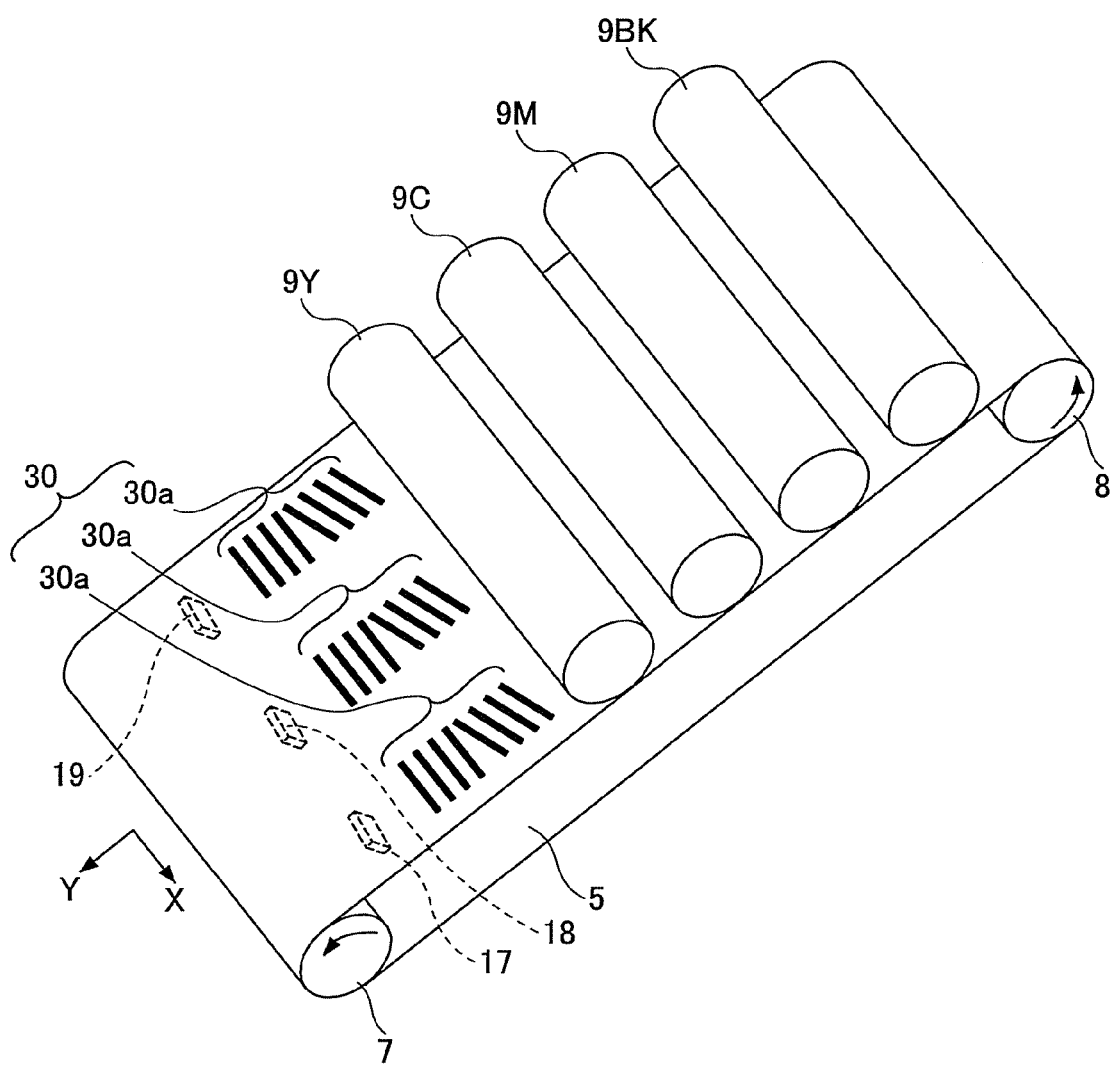
FIG. 3 is a diagram illustrating sensors and a pattern for positional displacement correction.

FIG. 3 is a diagram illustrating sensors as image detecting devices and a pattern for positional displacement correction. In FIG. 3, the identical reference numerals are provided for the components identical to those of FIG. 1 and an explanation thereof may be omitted. Additionally, FIG. 3 schematically illustrates FIG. 1 as viewed from the side of the light exposure device 11. As illustrated in FIG. 3, respective patterns 30a constituting a pattern for positional displacement correction 30 are image-made at positions to correspond to sensors 17, 18, and 19 on an intermediate transfer belt 5 in order to calculate information of positional displacement amounts necessary for positional displacement correction, and the amounts of positional displacement among the respective colors are detected by the sensors 17, 18, and 19. The respective patterns 30a constituting a pattern for positional displacement correction 30 are detected by the sensors 17, 18, and 19, respectively, and removed from the intermediate transfer belt 5 by a cleaning part 20. The cleaning part 20 is a cleaning blade pressed against the intermediate transfer belt 5 and scrapes toner attached to the surface of the intermediate transfer belt 5.

Figure 4:
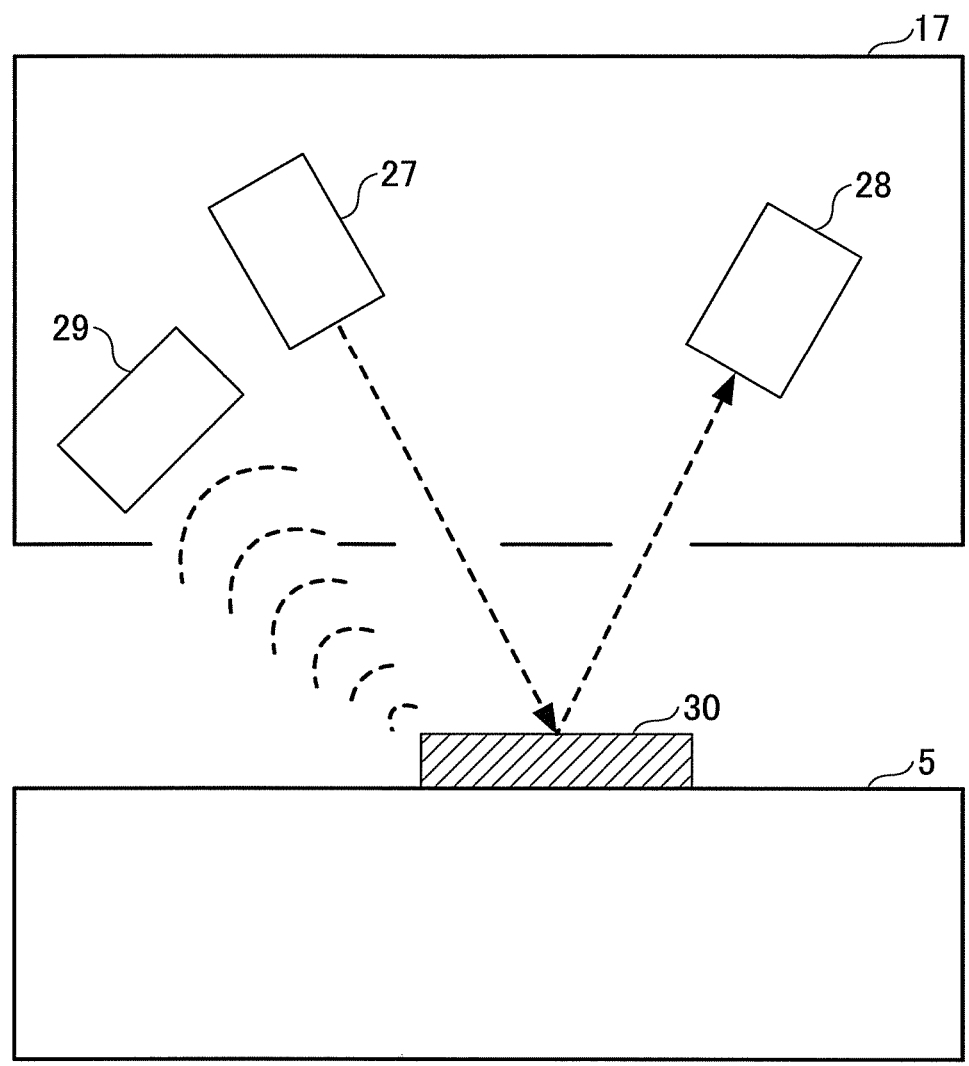
FIG. 4 is an enlarged view illustrating the sensor as illustrated in FIG. 3.

FIG. 4 is an enlarged view of a sensor that is an image detecting device. In FIG. 4, the identical reference numerals are provided for the components identical to those of FIG. 1 and an explanation thereof may be omitted. Additionally, a sensor 17 is illustrated in FIG. 4 and sensors 18 and 19 have similar structures. As referring to FIG. 4, the sensor 17 includes a light emitting part 27, a specularly reflected light receiving part 28, and a diffuse-reflected light receiving part 29. However, the diffuse-reflected light receiving part 29 may be unnecessary as described below.

In the sensor 17, an intermediate transfer belt 5 is irradiated with a light beam from the light emitting part 27, and reflected light including a specularly reflected light component and a diffuse-reflected light component is received by the specularly reflected light receiving part 28. Thus, the sensor 17 has a function of detecting a pattern for positional displacement correction 30. Herein, only the specularly reflected light receiving part 28 may be capable of detecting the pattern for positional displacement correction 30 while the diffuse-reflected light receiving part 29 may not be used. The diffuse-reflected light receiving part 29 is used for detection of a pattern for adjusting an amount of attached toner which is also used for adjusting an amount of attached toner in a related art.

Thus, the pattern for positional displacement correction 30 is image-made and detected to correct positional displacement among the respective colors, whereby it may be possible to output a high quality image. However, it takes a predetermined period of time to conduct image-making and detection of the pattern for positional displacement correction 30, and hence, when positional displacement correction based on image-making and detection of the pattern for positional displacement correction 30 is conducted frequently, an increase of downtime for a user may be caused thereby. Therefore, both positional displacement correction based on image-making and detection of the pattern for positional displacement correction 30 and positional displacement correction conducted by measuring a change in the timing at which a laser light beam passes through a predetermined position are used in combination in an image forming apparatus according to the first illustrative embodiment.

The latter positional displacement correction utilizing a change in the timing of passage of a laser light beam is also achieved by using a PD with a non-parallel shape in a related art, and however, is conducted in an image forming apparatus according to the first illustrative embodiment by using a plurality of low-cost PDs without using an expensive PD with a non-parallel shape and arranging them at predetermined positions and predetermined angles, as described in detail below.

[Positional Displacement Correction Utilizing a Change in the Timing of Passage of a Laser Light Beam]

Figure 5A:
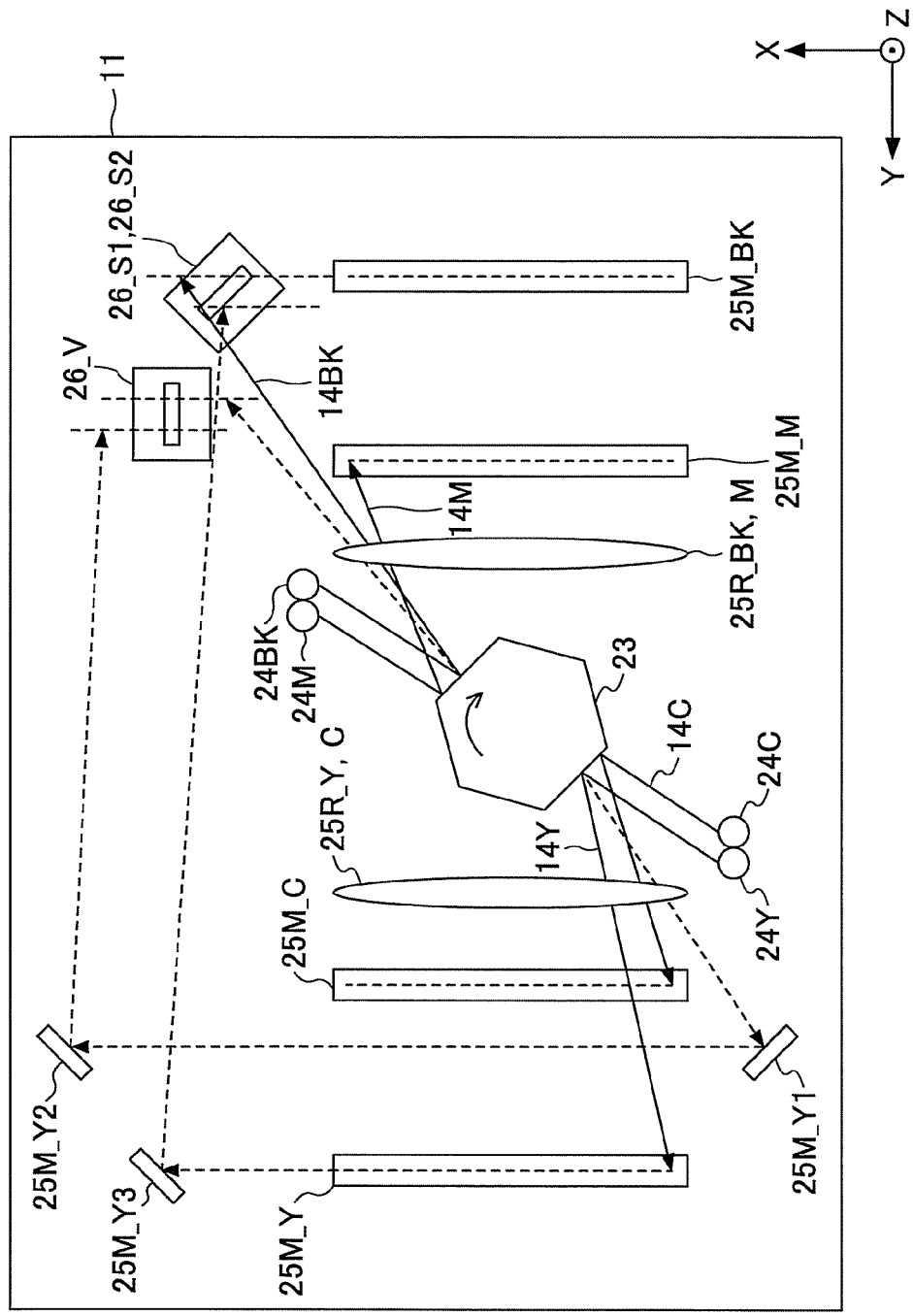
FIG. 5A is a plan view illustrating a principal configuration inside a light exposure device according to a first illustrative embodiment of the present invention.
Figure 5B:
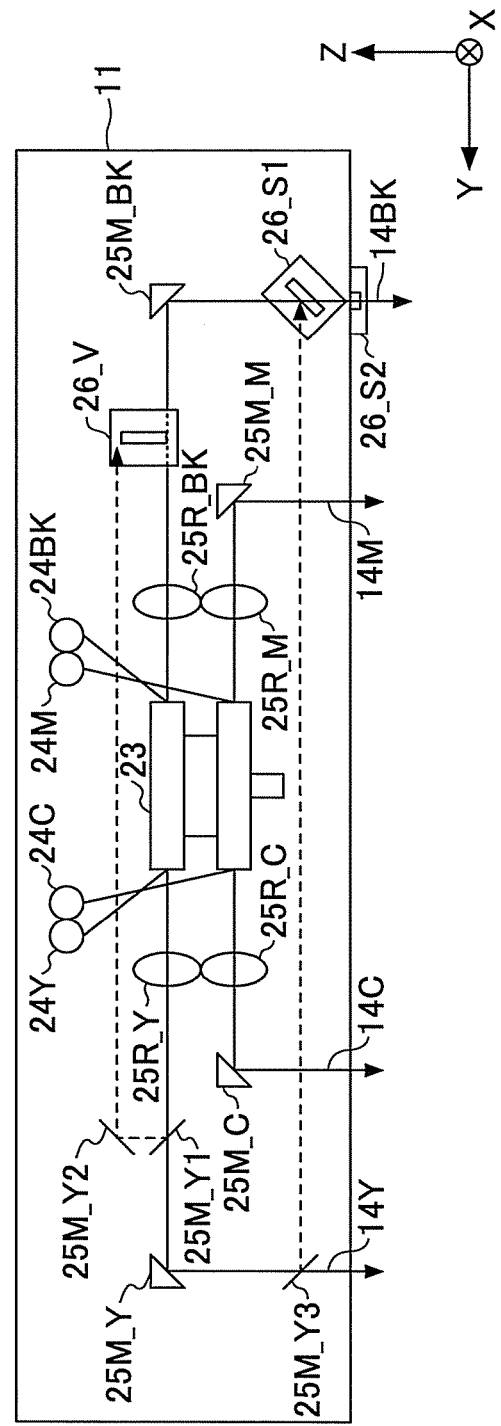
FIG. 5B is a side view illustrating a principal configuration inside a light exposure device according to a first illustrative embodiment of the present invention.

Next, positional displacement correction utilizing a change in the timing of passage of a laser light beam will be described. FIG. 5A is a plan view illustrating a principal internal structure of a light exposure device for the first illustrative embodiment. FIG. 5B is a side view illustrating a principal internal structure of a light exposure device for the first illustrative embodiment.

As referring to FIG. 5A and FIG. 5B, laser light beams 14BK, 14M, 14C, and 14Y as exposure light beams of respective colors are emitted from laser diodes 24BK, 24M, 24C, and 24Y as light sources, respectively, in a light exposure device 11. The emitted laser light beams 14BK, 14M, 14C, and 14Y are reflected from a reflecting mirror 23, then pass through f-θ lenses 25R for adjusting a main scanning magnification and folding mirrors 25M provided for the respective colors to adjust their light paths, and subsequently scan faces to be scanned which are the surfaces of photoconductor drums 9BK, 9M, 9C, and 9Y (see FIG. 2). Additionally, BK, M, Y, and C behind hyphens for 25R and 25M indicate optical systems for black, magenta, yellow, and cyan colors, respectively. The folding mirrors 25M are typical examples of plural light path changing devices for an illustrative embodiment of the present invention.

The reflecting mirror 23 is a hexagonal polygon mirror and rotates whereby it is possible to move an exposure light beam for scanning by one line in a main scanning direction per one face of the polygon mirror. Scanning is conducted by one polygon mirror for the four laser diodes as light sources. The laser light beams 14BK and 14M and the laser light beams 14C and 14Y are separated into such two sets of exposure light beams of two colors and scanning is conducted by using opposing reflecting faces of the reflecting mirror 23 (polygon mirror) whereby it may be possible to conduct light exposure on four different photoconductor drums simultaneously. Thus, the reflecting mirror 23 rotates to move plural light beams (laser light beams 14BK, 14M, 14C, and 14Y) emitted from plural light sources (laser diodes 24BK, 24M, 24C, and 14Y) for scanning in a main scanning direction. The reflecting mirror 23 is a typical example of a scanning device for an illustrative embodiment of the present invention.

Synchronization detection sensors 26_V, 26_S1, and 26_S2 are arranged outside an imaging area at an end side in a main scanning direction. The synchronization detection sensor 26_V is provided such that a light receiving face of the sensor is perpendicular to a main scanning direction, and the synchronization detection sensors 26_S1 and 26_S2 are provided such that light receiving faces of the sensors have inclinations of 45° with respect to a main scanning direction. The synchronization detection sensor 26_V is a typical example of a first light detecting device for an illustrative embodiment of the present invention. Also, the synchronization detection sensors 26_S1 and 26_S2 are typical examples of a second light detecting device and a third light detecting device for an illustrative embodiment of the present invention, respectively, and have the light receiving faces which are non-parallel to the light receiving face of the synchronization detection sensor 26_V that is a typical example of a first light detecting device.

The synchronization detection sensor 26_V detects laser light beams 14BK and 14Y for each scanning operation of one line and adjusts the timing of start of light exposure for image formation. The synchronization detection sensor 26_V is arranged at a side of the f-θ lens 25R_BK, and hence, the laser light beam 14Y is incident on the synchronization detection sensor 26_V via folding mirrors for synchronization detection 25M_Y1 and 25M_Y2. It may be impossible for the synchronization detection sensors to adjust the timing of writing with the laser light beams 14M and 14C, and hence, the timing of start of light exposure for magenta and the timing of start of light exposure for cyan are adjusted to the timing of start of light exposure for black and the timing of start of light exposure for yellow, so that images of the respective colors are positioned with one another.

The synchronization detection sensor 26_S1 detects the laser light beam 14BK after passing through the folding mirror 25M_BK and the laser light beam 14Y after passing through the folding mirror 25M_Y for each scanning operation of one line at the shortest scanning distance. A scanning time period after the synchronization detection sensor 26_V detects the laser light beams 14BK and 14Y and before the synchronization detection sensor 26_S1 conducts detection thereof is utilized for positional displacement correction. The synchronization detection sensor 26_S1 is arranged at a side of the f-θ lens 25R_BK and the laser light beam 14Y is incident on the synchronization detection sensor 26_S1 via the folding mirror for synchronization detection 25M_Y3.

When the internal temperature of the light exposure device 11 rises to vary the angles of the folding mirrors 25M or to vary the angles of the f-O lenses 25R, the positions of light exposure with the laser light beams 14BK and 14Y in a sub-scanning direction vary, and accordingly, the positions of detection of the laser light beams 14BK and 14Y by the synchronization detection sensor 26_S1 vary. With such variations of the positions of detection, scanning time periods for the laser light beams 14BK and 14Y between the synchronization detection sensor 26_V and the synchronization detection sensor 26_S1 vary. Hence, it may be possible to monitor variations of scanning time periods for the laser light beams 14BK and 14Y between the synchronization detection sensor 26_V and the synchronization detection sensor 26_S1 to detect variations of the positions of light exposure with the laser light beams 14Bk and 14Y. As a result, it may be possible to calculate amounts of color displacement of black and yellow in a sub-scanning direction which is caused by variations of the positions of light exposure. It may be possible to monitor variations of scanning time periods for the laser light beams 14BK and 14Y between the synchronization detection sensor 26_V and the synchronization detection sensor 26_S1 for each writing operation of one line at the shortest writing distance.

The synchronization detection sensor 26_S2 is not provided inside the light exposure device 11 but installed to be integrated with a wall face of a housing. The synchronization detection sensor 26_S2 detects the laser light beam 14BK after passing through the f-θ lens 25R_BK and the folding mirror 25M_BK for each scanning operation of one line at the shortest scanning distance. Hence, no optical component is present between the synchronization detection sensor 26_S2 and the photoconductor drum 9BK (not illustrated). Even if a variation of the laser light beam 14BK in a sub-scanning direction is caused in the light exposure device 11, a scanning time period between the synchronization detection sensor 26_S1 and the synchronization detection sensor 26_S2 may not vary.

However, when the light exposure device 11 is subjected to the influence of heat or influence of distortion of a body which originates from a temperature rise in an instrument to change the shape of the light exposure device 11, a scanning time period between the synchronization detection sensor 26_S1 and the synchronization detection sensor 26_S2 may vary. Herein, although it is considered that a variation of the position of light exposure may also be caused on the photoconductor drum 9BK (not illustrated) or the like, a scanning time period between the synchronization detection sensor 26_V and the synchronization detection sensor 26_S1 is not greatly changed, and hence, it may be impossible to detect deformation of the light exposure device 11 even if a scanning time period between the synchronization detection sensor 26_V and the synchronization detection sensor 26_S1 is monitored. Accordingly, when a scanning time period between the synchronization detection sensor 26_S1 and the synchronization detection sensor 26_S2 is monitored and such a period of time varies, a decision may be made with respect to the fact that deformation of the light exposure device 11 is caused.

While deformation of the light exposure device 11 is caused, it may be impossible to calculate an amount of positional displacement normally even if a scanning time period between the synchronization detection sensor 26_V and the synchronization detection sensor 26_S1 continues to monitor, and hence, positional displacement correction using a pattern for positional displacement correction as illustrated in FIG. 3 is conducted and scanning time periods between the synchronization detection sensor 26_V and the synchronization detection sensor 26_S1 and between the synchronization detection sensor 26_S1 and the synchronization detection sensor 26_S2 on the condition of normal positioning are recorded. Additionally, the synchronization detection sensor 26_S2 is not necessarily integrated with a wall face of a housing of the light exposure device 11 and may be separated from the wall face of the housing as long as it is arranged outside the housing.

Herein, FIG. 5A and FIG. 5B merely illustrate the general arrangement of the synchronization detection sensors 26_V, 26_S1, and 26_S2, schematically and optical systems for guiding each laser light beam to the synchronization detection sensors 26_V, 26_S1, and 26_S2 are omitted. Also, the orientations of the synchronization detection sensors 26_V, 26_S1, and 26_S2 may be different from actual ones, for convenience of explanation of light paths. Furthermore, although the positions of the synchronization detection sensors 26_V, 26_S1, and 26_S2 may not be consistent between FIG. 5A and FIG. 5B for convenience of explanation of light paths, the synchronization detection sensors 26_V, 26_S1, and 26_S2 may be arranged arbitrarily as long as the "conditions for arrangement" as described below are satisfied.

In practice, the light paths of laser light beams 14BK and 14Y may be changed to light paths in a main scanning direction (which are parallel to an X-axis) by a predetermined optical system 26P including a mirror or the like to be perpendicularly incident on a light receiving face of the synchronization detection sensor 26_V (that is, $\theta_1=90$ degrees) as illustrated in FIG. 5C. Also, the light paths of laser light beams 14BK and 14Y may be changed to light paths in a main scanning direction (which are parallel to an X-axis) by a predetermined optical system 26Q including a mirror or the like to be obliquely incident on a light receiving face of the synchronization detection sensor 26_S1 at an angle of $\theta_2=45$ degrees. Furthermore, the light path of a laser light beam 14BK may be changed to a light path in a main scanning direction (which is parallel to an X-axis) by a predetermined optical system 26R including a mirror or the like to be obliquely incident on a light receiving face of the synchronization detection sensor 26_S2 at an angle of $\theta_3=45$ degrees.

The conditions for arrangement of the synchronization detection sensors 26_V, 26_S1, and 26_S2 may be, the synchronization detection sensors 26_V, 26_S1, and 26_S2 being arranged outside an imaging area at an end side in a main scanning direction, a light receiving face of the synchronization detection sensor 26_V being perpendicular to the main scanning direction, light receiving faces of the synchronization detection sensors 26_S1, and 26_S2 having an inclination of 45° with respect to the main scanning direction, the synchronization detection sensor 26_V being arranged in an optical path between a reflecting mirror 23 and a photoconductor drum, the synchronization detection sensors 26_S1, and 26_S2 being arranged in an optical path between a folding mirror 25M and the photoconductor drum, the synchronization detection sensors 26_V, and 26_S1 being arranged inside a housing of a light exposure device 11, and the synchronization detection sensor 26_S2 being arranged outside the housing of the light exposure device 11. As long as such conditions are satisfied, the synchronization detection sensors 26_V, 26_S1, and 26_S2 may be arranged arbitrarily.

Next, a process for controlling a light exposure device 11 will be described with reference to FIG. 6. FIG. 6 is a diagram for illustrating a process for controlling a light exposure device. In FIG. 6, a rotation controlling part 55 receives an instruction from a CPU 51, and accordingly, rotates a reflecting mirror 23. A rotation monitoring part 56 monitors as to whether the reflecting mirror 23 rotates constantly, and generates an error signal if an abnormality in such rotation is caused.

After it is confirmed that the reflecting mirror 23 rotates constantly, a light emission period controlling part 57 controls laser diodes 24BK and 24Y so that laser light beams are emitted until synchronization detection sensors 26_V, 26_S1, and 26_S2 detect laser light beams 14BK and 14Y. Herein, the light intensities of the laser light beams 14BK and 14Y are controlled by a light emission amount controlling part 58 to levels that are detectable by the synchronization detection sensors 26_V, 26_S1, and 26_S2. A filter 59 passes only a detected component of the laser light beam 14BK or the like among signals obtained by irradiating the synchronization detection sensors 26_V, 26_S1, and 26_S2 with the laser light beam 14BK or the like, and an A/D conversion part 60 converts analog data to digital data.

Data sampling is controlled by a sampling controlling part 61 and the sampling rate thereof is provided by using a clock with a frequency higher than the frequency of the light emission period controlling part 57. A polygon error signal and synchronization detection data pass through an I/O port 49 and are loaded on the CPU 51 through a data bus 50. The CPU 51 receives the synchronization detection data, then controls the light emission period controlling part 57 and the light emission amount controlling part 58, and turns off the laser light beams 14BK and 14Y.

Furthermore, timing of image writing (start of light exposure) for correctly forming an image on a photoconductor drum 9 is calculated from the timing of receiving of a synchronization detection data signal. Also, when the CPU 51 receives a polygon error signal, a rotation control for the reflecting mirror 23 and a light emission control for the laser diodes 24BK and the like are stopped.

Image data are stored in a RAM 52, and when image writing is started, the image data transfer to the CPU 51. The CPU 51 converts the image data into data for a period of time of turning on, a level of turning on, and a period of time of turning off, the laser diodes 24BK and the like, which transfer to the light emission period controlling part 57 and the light emission amount controlling part 58. A program of controlling formation of image data as described above is stored on a ROM 53. Thus, the CPU 51 and the ROM 53 function as controlling devices for controlling an operation of the whole of an image forming apparatus.

Next, a function of a light exposure positional displacement amount calculating device for measuring a scanning time period between the synchronization detection sensor 26_V and the synchronization detection sensor 26_S1 and calculating an amount of positional displacement of light exposure based on a result of such measurement and a function of a scanning time period measuring device for measuring a scanning time period between the synchronization detection sensor 26_S1 and the synchronization detection sensor 26_S2 will be described. It may be possible to provide the CPU 51, the ROM 53, or the like, as the light exposure positional displacement amount calculating device and the scanning time period measuring device.

When a positional displacement correction is conducted by using a pattern for positional displacement correction as illustrated in FIG. 3, an amount of displacement in a sub-scanning direction Y1 and an amount of timing delay of writing F1 (by one line unit) on the condition that displacement is corrected are calculated. While such positional displacement correction is conducted, the light exposure positional displacement amount calculating device measures a scanning time period T1 between the synchronization detection sensor 26_V and the synchronization detection sensor 26_S1 and the scanning time period measuring device measures a scanning time period T1' between the synchronization detection sensor 26_S1 and the synchronization detection sensor 26_S2. Such a scanning time period T1 is a reference value of a scanning time period between the synchronization detection sensor 26_V and the synchronization detection sensor 26_S1. Also, such a scanning time period T1' is a reference value of a scanning time period between the synchronization detection sensor 26_S1 and the synchronization detection sensor 26_S2. Herein, when a sampling rate which may be required for detection of a scanning time period is higher than a writing frequency, it may be possible to measure a precise amount of color displacement which is equal to or smaller than one dot.

After such positional displacement correction is conducted, image output is conducted. Herein, the light exposure positional displacement amount calculating device calculates a scanning time period T2 between the synchronization detection sensor 26_V and the synchronization detection sensor 26_S1 for each light exposure of n lines (n is a natural number). When the scanning time period T2 is different from the scanning time period T1, it is considered that either or both of the positions of an f-θ lens 25R_BK and folding mirror 25M_BK may vary due to a temperature rise in a light exposure device 11 or the like to cause color displacement on an image. In order to correct such color displacement, the light exposure positional displacement amount calculating device calculates an amount of color displacement in a sub-scanning direction Y2 from the scanning time periods T1 and T2 and changes the amount of timing delay of writing to F2.

It may be possible to calculate Y2 in accordance with the following formula (1):

$$Y2 = (T2-T1) \times (\text{a rotational speed of a reflecting mirror } 23 \times L1) \quad \text{formula (1)}.$$

Herein, L1 in formula (1) is a distance from the reflecting mirror 23 to the synchronization detection sensor 26_S1. Furthermore, the synchronization detection sensor 26_S1 is inclined by 45° with respect to a main scanning direction, and hence, the ratio of an amount of displacement detected in a main scanning direction and an amount of displacement in a sub-scanning direction is 1:1.

It may be possible to calculate an amount of timing delay of writing F2 in accordance with the following formula (2):

$$F2 = F1 - Y2/\Delta D \quad \text{formula (2)}.$$

Herein, ΔD in formula (2) is a length of one line in a sub-scanning direction (42.3 μm for 600 dpi). It may be possible to set such an F2 at an amount of timing delay of writing to output an image with no color displacement in a sub-scanning direction.

In the light exposure device 11 as illustrated in FIG. 5A and FIG. 5B, it may be possible for color displacement correction with respect to the laser light beams 14BK and 14Y to be detected by the synchronization detection sensor 26_S1 when only detection of the scanning time periods T1 and T2 is conducted. Furthermore, the scanning time period T1 is updated for each positional displacement correction using a pattern for positional displacement correction as illustrated in FIG. 3. The timing of updating is determined by the number of a printing operation(s) or a period of time of an apparatus operation. Also, it may be possible to conduct determination from the scanning time period T1'. When image output is conducted after positional displacement correction is conducted, the scanning time period measuring device calculates a scanning time period T2' between the synchronization detection sensor 26_S1 and the synchronization detection sensor 26_S2 for each light exposure of n lines (n is a natural number). When the scanning time period T2' is different from the scanning time period T1', the shape of the light exposure device 11 may be changed by a temperature rise in the light exposure device 11 or the like to change the position of light exposure on a photoconductor drum. Such a change may not appear in detection of the scanning time period T2, and accordingly, when the amount of timing delay of writing is corrected based on a result of measurement of the scanning time period T2 on such a condition, a color displacement error may be caused. Hence, when the difference between the scanning time period T2' and the scanning time period T1' exceeds a predetermined threshold value, positional displacement correction using a pattern for positional displacement correction as illustrated in FIG. 3 is conducted immediately.

For colors for which no laser light beam is detected by the synchronization detection sensor 26_S1 (colors for to the laser light beams 14M and 14C), correction is conducted by using the amount of color displacement of the detected color. Herein, an error may be caused because of an indirect correction. In order to eliminate an error caused by indirect correction, the ratios of the amounts of color displacement between the respective colors may be held in a table preliminarily.

Also, a light receiving face of the synchronization detection sensor 26_S1 is inclined by 45° with respect to a main scanning direction, and if such an inclination is changed, a detection error may be caused in the amount of displacement in a sub-scanning direction. In order to correct such an inclination error, a correction factor α is used. The correction factor α may be determined as a fixed value preliminarily or may be updated by conducting positional displacement correction using a pattern for positional displacement correction as illustrated in FIG. 3. In the case of a fixed value, the correction factor α=1 is provided when the inclination of a light receiving face of the synchronization detection sensor 26_S1 is 45°. When the inclination of a light receiving face of the synchronization detection sensor 26_S1 deviates from 45°, a suitable value is set based on a value measured in a production process or a value inputted by a user or a service man.

Next, a method for updating a correction factor α by conducting positional displacement correction will be described. Positional displacement correction is periodically conducted depending on the number of a printing operation(s) or a period of time of rotation of a polygon. A scanning time period T1 updated at the time when the (m−1)th positional displacement correction is conducted is a scanning time period T1 (m−1) and a scanning time period T1 updated at the time when the mth positional displacement correction is conducted is a scanning time period T1(m). A correction factor α is calculated from the amount of displacement in a sub-scanning direction Y1 (m) detected at the time when the mth positional displacement correction is conducted, in accordance with formula (3):

$$\alpha = Y1(m)/[\{T1(m)-T1(m-1)\} \times (\text{a rotational speed of a reflecting mirror } 23 \times L1)] \quad \text{formula (3)}.$$

Correction of timing of subsequent writing of a line is conducted by using a correction factor α obtained by formula (3). It may be possible to correct the amount of timing delay of writing F2 in accordance with the following formula (4):

$$F2 = (F1 - Y2/\Delta D) \times \alpha \quad \text{formula (4)}.$$

The larger the rate of contribution of the amount of positional displacement of light exposure involved with a temperature rise in the light exposure device 11 in the amount of displacement Y1(m) in a sub-scanning direction detected at the time when the mth positional displacement correction is conducted is, the more accurate a calculated value of the correction factor α is.

A calculation method for improving the precision of such a correction factor α is illustrated by formula (5):

$$\alpha = \text{Average}(\alpha(m), \alpha(m-1), \alpha(m-2), \ldots) \quad \text{formula (5)}.$$

Herein, α(m) in formula (5) is a correction factor calculated at the time when the mth positional displacement correction is conducted while Average (parameter 1, parameter 2, . . . ) is a function of calculating an average value of all the parameters. When α is calculated in accordance with formula (5), the value(s) of a component(s) except the amount of positional displacement of light exposure involved with a temperature rise in the light exposure device 11 is/are averaged so that it may be possible to conduct stable correction.

Alternatively, there is provided a method of determining that the rate of contribution of the amount of positional displacement of light exposure involved with a temperature rise in the light exposure device 11 is large, in the case where an amount of displacement in a sub-scanning direction Y1 calculated at the time when a last positional displacement correction is conducted is equal to or more than a threshold value (ex. 200 µm), and updating a correction factor α. Otherwise, no correction factor α is updated. Furthermore, an average rotational speed Xave of the reflecting mirror 23 from when the (m−1)th positional displacement correction is conducted until when the mth positional displacement correction is conducted is calculated. When a rotational speed of the reflecting mirror 23 at the time of image formation is X1 (rpm), $$Xave=(X1 \times Ton)/Ttotal \qquad \text{formula (6)}$$

is provided.

Herein, Ton in formula (6) is a period of time when a reflecting mirror 23 rotates, while Ttotal is a period of time when the (m−1)th to mth positional displacement correction is conducted. There is provided a method of presuming that the temperature in the light exposure device 11 is greatly elevated between an interval of positional displacement correction when Xave is equal to or more than a threshold value (ex. 25000 rpm), then determining that the rate of contribution of the amount of positional displacement of light exposure in the amount of displacement in a sub-scanning direction is large, and updating a correction factor α. Otherwise, no correction factor α is updated.

Alternatively, a temperature detecting device such as a thermometer (not illustrated) for measuring ambient temperature around the reflecting mirror 23 that is a scanning device in the light exposure device 11 is provided and the temperature detecting device calculates a temperature change K in the light exposure device 11 from when the (m−1)th positional displacement correction is conducted until when the mth positional displacement correction is conducted. There is provided a method of determining that the rate of contribution of the amount of positional displacement of light exposure in the amount of displacement in a sub-scanning direction is large when such K is equal to or more than a threshold value (ex. 20° C.), because the temperature in the light exposure device 11 greatly rises between an interval of positional displacement correction, and updating a correction factor α. Otherwise, no correction factor α is updated.

Furthermore, the thermometer calculates a temperature K(m−1) in the light exposure device 11 at the time when the (m−1)th positional displacement correction is conducted, and when K(m−1) is equal to or more than a threshold value (ex. 20° C.) or equal to or less than outside air temperature, determination of a cooling state is made. There is provided a method of presuming that the temperature in the light exposure device 11 greatly rises from a cooling state to the mth positional displacement correction, determining that the rate of contribution of the amount of positional displacement of light exposure in the amount of displacement in a sub-scanning direction is large, and updating a correction factor α. Otherwise, no correction factor α is updated.

Figure 7:
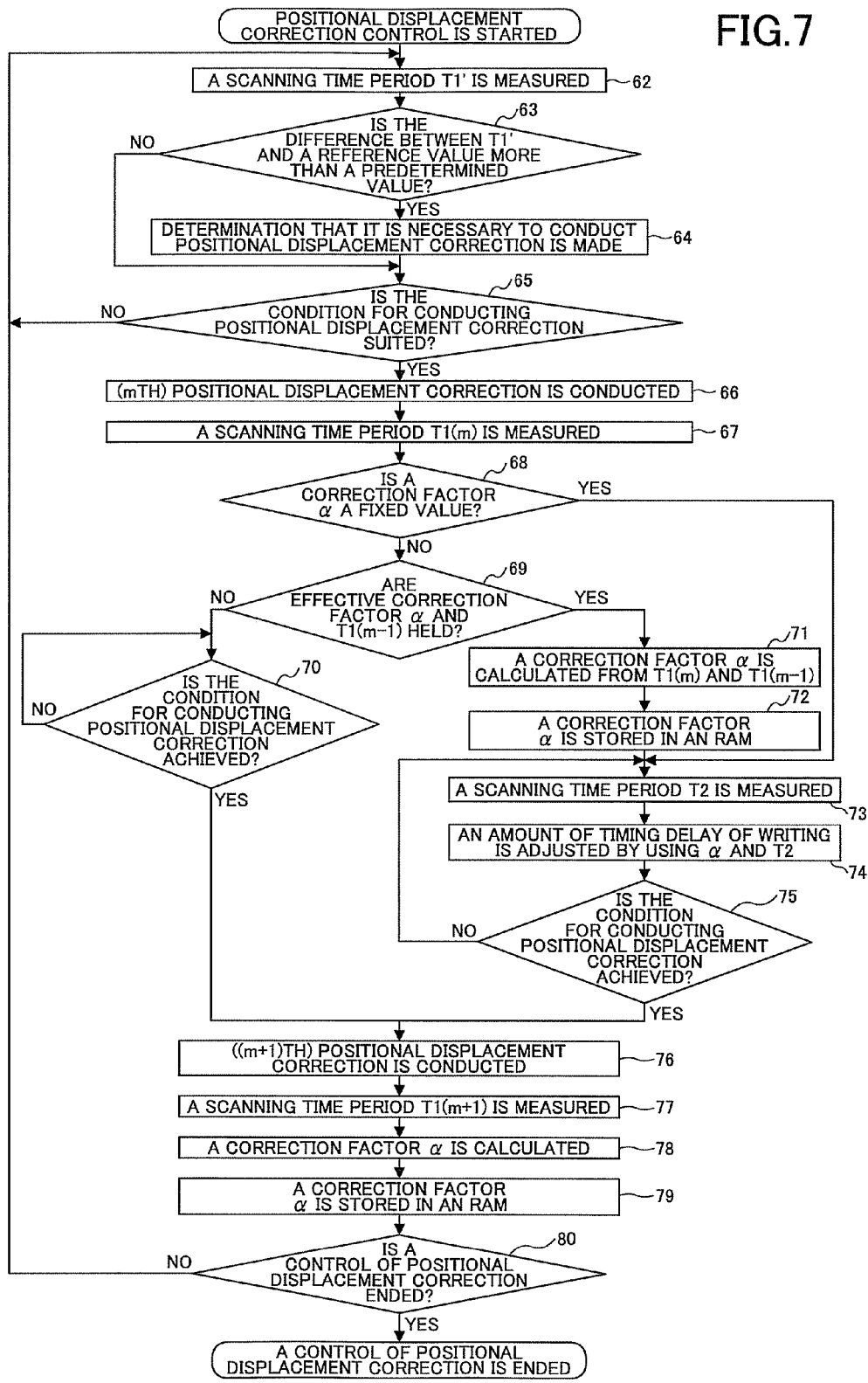
FIG. 7 is an example of a flow chart for positional displacement correction.

A flow of a control of positional displacement correction as described above will be described in detail with reference to FIG. 7. FIG. 7 is an example of a low chart for positional displacement correction. First, a scanning time period T1' between a synchronization detection sensor 26_S1 and a synchronization detection sensor 26_S2 is measured in step 62. Then, the scanning time period T1' is compared with a reference value in step 63 to determine whether the difference between the scanning time period T1' and the reference value is more than a predetermined value, and if it is larger (if yes), transfer to step 62 is conducted whereas if it is smaller (if no), transfer to step 65 is conducted. When the difference between the scanning time period T1' and the reference value is more than the predetermined value (when Yes), a determination that it is necessary to conduct positional displacement correction using a pattern for positional displacement correction as illustrated in FIG. 3 is made in step 64. Herein, the reference value in step 63 is a scanning time period between the synchronization detection sensor 26_S1 and the synchronization detection sensor 26_S2 which is measured by a scanning time period measuring device simultaneously with positional displacement correction.

Then, a determination as to whether a condition for conducting positional displacement correction is achieved is made in step 65, and if such achievement is provided (if yes), transfer to step 66 is conducted. Herein, the condition for conducting positional displacement correction is, for example, the case where 100 printing operations are conducted continuously, the case where printing for 3 minutes is conducted continuously, the case where the temperature in a light exposure device 11 rises to a predetermined temperature, or the like. Then, the (mth) positional displacement correction using a pattern for positional displacement correction as illustrated in FIG. 3 is conducted in step 66.

Then, a scanning time period T1(m) between a synchronization detection sensor 26_V and the synchronization detection sensor 26_S1 is measured in step 67. Then, a CPU determines whether a correction factor α is a value to be updated at the time when positional displacement correction is conducted or treated as a fixed value of a product in step 68, and if an update is made (if yes), transfer to step 60 is made whereas if a fixed value is provided (if no), transfer to step 73 is made.

Then, whether a RAM holds an effective value as a correction factor α and whether a scanning time period T1(m−1) measured by the synchronization detection sensors 26_V and 26_S1 is held at the time when the ((m−1)th) positional displacement correction is conducted are determined in step 69, and if both of them are held (if yes), transfer to step 71 is conducted. If one of them is not held (if no), transfer to step 70 is conducted. Whether the condition for conducting positional displacement correction is achieved is determined in step 70, and if achievement is made (if yes), transfer to step 67 is conducted.

Then, a correction factor α is calculated by using the scanning time period T1(m) and the scanning time period T1(m−1) in step 71. Then, the correction factor α is stored in the RAM in step 72. Then, a scanning time period T2 between the synchronization detection sensor 26_V and the synchronization detection sensor 26_S1 is measured in step 73. The timing of measurement is a frequency of one time per n lines (n≧1) during rotation of a reflecting mirror 23. Then, the correction factor α, the scanning time period T2, and the scanning time period T1(m) as a reference are used to adjust the position of an image in a sub-scanning direction in step 74. Such adjustment is conducted by changing an amount of timing delay of writing.

Then, whether the condition for conducting positional displacement correction is achieved is determined in step 75, and if achievement is made (if yes), transfer to step 67 is conducted whereas if achievement is not made (If no), transfer to step 73 is conducted. Then, the ((m+1)th) positional displacement correction using a pattern for positional displacement correction as illustrated in FIG. 3 is conducted in step 67. Then, a scanning time period T1(m+1) between the synchronization detection sensor 26_V and the synchronization detection sensor 26_S1 is measured in step 77.

Then, a correction factor α is calculated by using the scanning time period T1(m+1) and the scanning time period T1(m) in step 78. Then, the correction factor α is stored in the RAM in step 79. Then, whether a control of positional displacement correction is ended is determined in step 80, and if an end is made (if yes), the control of positional displacement correction as described above is ended. If an end is not made (if no), transfer to step 62 is conducted.

Thus, according to the first illustrative embodiment, a first synchronization detection sensor arranged in an optical path between a reflecting mirror and at least one photoconductor drum and having a light receiving face perpendicular to a main scanning direction, and a second synchronization detection sensor arranged in an optical path between at least one folding mirror and at least one photoconductor drum and having a light receiving face that is not parallel to the light receiving face of the first synchronization detection sensor, are included. Herein, it may be possible to monitor a scanning time period between the first synchronization detection sensor and the second synchronization detection sensor to calculate an amount of color displacement in a sub-scanning direction.

Also, a third synchronization detection sensor having a light receiving face that is not parallel to the light receiving face of the first synchronization detection sensor is included outside a housing of a light exposure device. Herein, it may be possible to monitor a scanning time period between the second synchronization detection sensor and the third synchronization detection sensor to detect presence or absence of deformation of the light exposure device. If deformation of the light exposure device is caused, it may be possible to conduct correction using a pattern for positional displacement correction to conduct accurate positional displacement correction. Alternatively, even when PDs with a non-parallel shape are used instead of the first synchronization detection sensor and the second synchronization detection sensor, it may be possible to further include the third synchronization detection sensor to provide a similar effect.

Also, it may be possible to provide an inexpensive light exposure device because no PD with a non-parallel shape is used.

Also, positional displacement correction with a short required time based on measurement of the difference between scanning time periods with a laser light beam reaching the first synchronization detection sensor and a laser light beam reaching the second synchronization detection sensor is conducted to compensate for positional displacement correction with a long required time based on image-making and detection of a pattern for positional displacement correction, whereby it may be possible to reduce the frequency of the positional displacement correction with a long required time based on image-making and detection of a pattern for positional displacement correction and it may be possible to reduce downtime for a user.

In addition, the inclination of the third synchronization detection sensor with respect to the second synchronization detection sensor is preferably 45°. The first synchronization detection sensor is separated from the second synchronization detection sensor and the third synchronization detection sensor so that the inclination of each sensor may easily vary, and if the inclination is not 45°, a result of detection may be influenced to cause an error in detection of an amount of sub-scanning color displacement. In order to correct such a detection error, it may be possible to conduct detection of an amount of sub-scanning color displacement due to positional displacement correction and detection of an amount of positional displacement of light exposure due to a synchronization detection sensor simultaneously and add the difference between the two amounts of positional displacement as an offset to a result of subsequent detection conducted by the synchronization detection sensor.

Second Illustrative Embodiment

In a second illustrative embodiment of the present invention, an example of a light exposure device 11A to be used instead of the light exposure device 11 used in the first illustrative embodiment is illustrated. Except the light exposure device 11A, a configuration similar to that of the first illustrative embodiment is provided. For parts common to those of the first illustrative embodiment, an explanation thereof will be omitted below and a part different from that of the first illustrative embodiment will be described mainly.

Figure 8B:
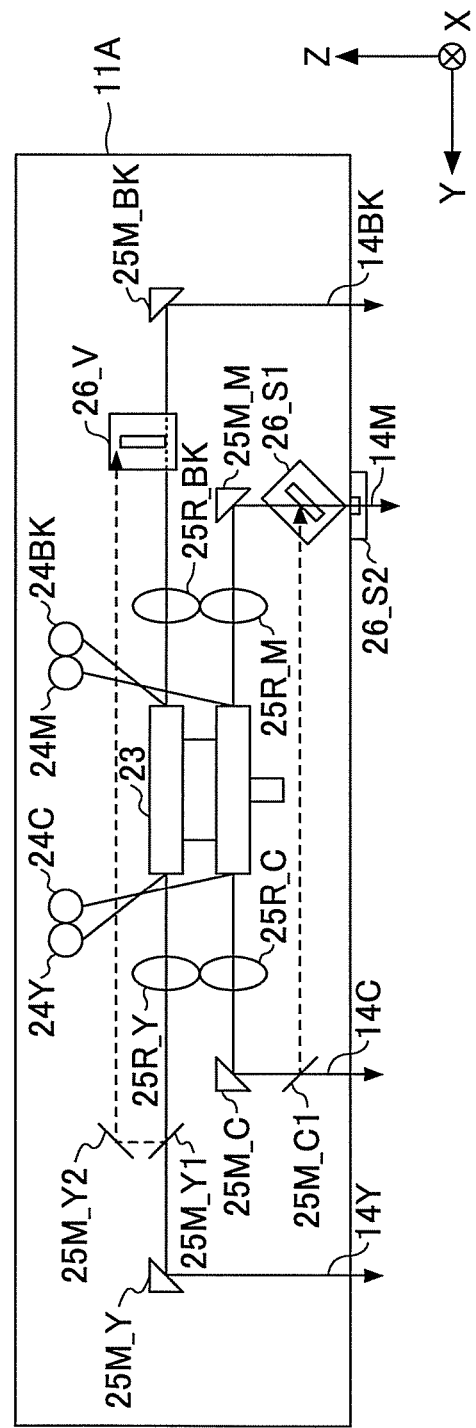
FIG. 8B is a side view illustrating a principal configuration inside a light exposure device according to a second illustrative embodiment of the present invention.

FIG. 8A is a plan view illustrating a principal configuration inside a light exposure device for a second illustrative embodiment of the present invention. FIG. 8B is a side view illustrating a principal configuration inside a light exposure device for a second illustrative embodiment of the present invention. In FIG. 8A and FIG. 8B, the identical reference numerals are provided for the components identical to those in FIG. 5A and FIG. 5B and an explanation thereof may be omitted. Additionally, arrangement of the components may be different between FIG. 8A and FIG. 8B for convenience of explanation of an optical path.

As referring to FIG. 8A and FIG. 8B, the positions of synchronization detection sensors 26_S1 and 26_S2 in a light exposure device 11A are different from those of the light exposure device 11. In the light exposure device 11A, the synchronization detection sensor 26_S1 is arranged at a position where it is possible to detect laser light beams 14M and 14C, and the synchronization detection sensor 26_S2 is arranged at a position where it is possible to detect the laser light beam 14M. Also, the light exposure device 11A is different from the light exposure device 11 in that a folding mirror for synchronization detection 25M_C1 is provided instead of the folding mirror for synchronization detection 25M_Y3. The laser light beam 14C is incident on the synchronization detection sensor 26_S1 via the folding mirror for synchronization detection 25M_C1.

In the light exposure device 11A, the synchronization detection sensor 26_V detects the laser light beams 14BK and 14Y for each scanning operation of one line and adjusts the timing of start of light exposure at the time of image formation. The synchronization detection sensor 26_S1 detects the laser light beams 14M and 14C for each scanning operation of one line at the shortest scanning distance.

A scanning time period from the time when the synchronization detection sensor 26_V detects the laser light beams 14BK and 14Y to the time when the synchronization detection sensor 26_S1 detects the laser light beams 14M and 14C is measured, and a change in the measured scanning time period is monitored, whereby it may be possible to detect a change in the positions of exposure with the laser light beams 14M and 14C. As a result, it may be possible to calculate amounts of magenta (M) and cyan (C) color displacement in a sub-scanning direction which is caused by a change in the position of exposure. It may be possible to monitor a change in the measured scanning time period for each writing operation of one line at the shortest writing distance.

Folding mirrors 25M_M and 25M_C have distances from a reflecting mirror 23 which are shorter than those of folding mirrors 25M_BK and 25M_Y. A temperature rise in the light exposure device 11A is dominated by heat generation of the reflecting mirror 23, and hence, the rates of contribution of the amount of positional displacement of light exposure in the amount of displacement in a sub-scanning direction for magenta (M) and cyan (Y) are higher than those for black (BK) and yellow (Y). Hence, the synchronization detection sensor 26_S1 detects the laser light beams 14M and 14C, and accordingly, it may be possible to calculate an amount of displacement in a sub-scanning direction with a smaller error. Additionally, the synchronization detection sensor 26_S2 functions similarly to that of the first illustrative embodiment, and hence, an explanation thereof is omitted.

In addition, FIG. 8A and FIG. 8B merely illustrate the general configuration of the synchronization detection sensors 26_V, 26_S1, and 26_S2 schematically and optical systems for guiding respective laser light beams to the synchronization detection sensors 26_V, 26_S1, and 26_S2 are omitted. Also, the orientations of the synchronization detection sensors 26_V, 26_S1, and 26_S2 may be different from actual ones for convenience of explanation of an optical path, and in practice, may be as described with reference to FIG. 5C. Furthermore, the positions of the synchronization detection sensors 26_V, 26_S1, and 26_S2 may be different between FIG. 8A and FIG. 8B for convenience of explanation of an optical path, and however, any arrangement is allowed as long as the synchronization detection sensors 26_V, 26_S1, and 26_S2 satisfy the above-mentioned "conditions for arrangement" and apply to the description for a component of the light exposure device 11A which is different from that of the light exposure device 11.

Thus, according to the second illustrative embodiment, an effect similar to that of the first, illustrative embodiment may be provided and the following effect may be further provided. That is, a synchronization detection sensor 26_S1 detects laser light beams 14M and 14C for folding mirrors 25M_M and 25M_C arranged more closely to a reflecting mirror 23, and accordingly, it may be possible to calculate an amount of displacement in a sub-scanning direction with a smaller error.

Third Illustrative Embodiment

In a third illustrative embodiment of the present invention, an example of a light exposure device 11B to be used instead of the light exposure device 11 used in the first illustrative embodiment is illustrated. Except the light exposure device 118, a configuration similar to that of the first illustrative embodiment is provided. For parts common to those of the first illustrative embodiment, an explanation thereof will be omitted below and a part different from that of the first illustrative embodiment will be described mainly.

Figure 9A:
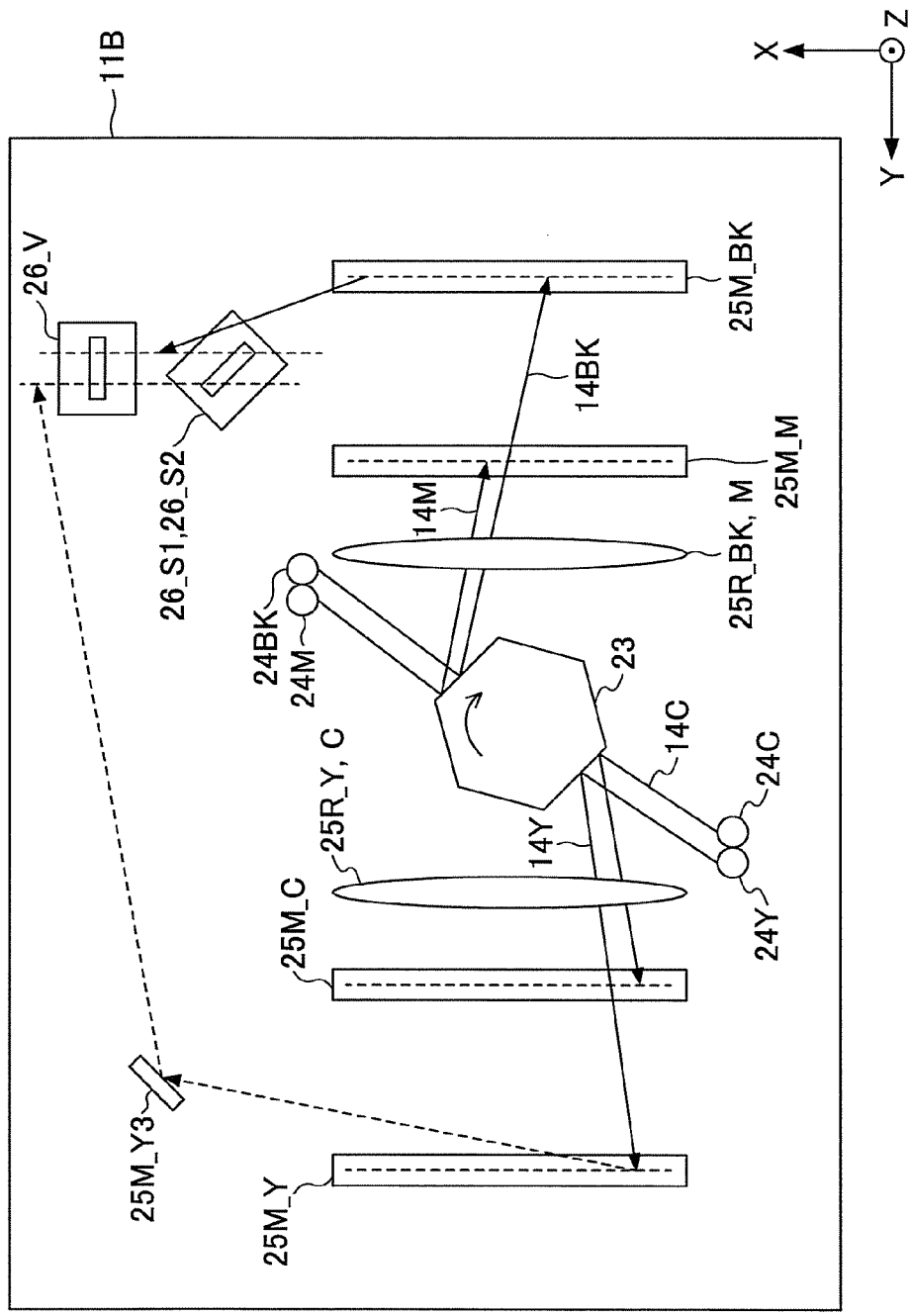
FIG. 9A is a plan view illustrating a principal configuration inside a light exposure device according to a third illustrative embodiment of the present invention.
Figure 9B:
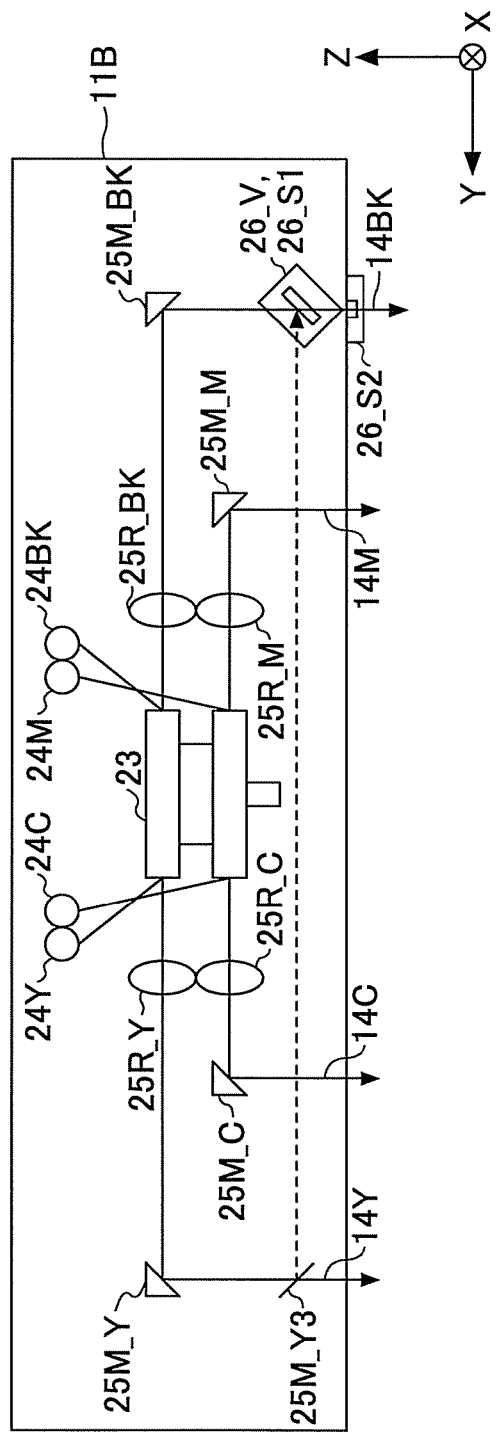
FIG. 9B is a side view illustrating a principal configuration inside a light exposure device according to a third illustrative embodiment of the present invention.

FIG. 9A is a plan view illustrating a principal configuration inside a light exposure device for a third illustrative embodiment of the present invention. FIG. 9B is a side view illustrating a principal configuration inside a light exposure device for a third illustrative embodiment of the present invention. In FIG. 9A and FIG. 9B, the identical reference numerals are provided for the components identical to those in FIG. 5A and FIG. 5B and an explanation thereof may be omitted. Additionally, arrangement of the components may be different between FIG. 9A and FIG. 9B for convenience of explanation of an optical path.

As referring to FIG. 9A and FIG. 9B, a synchronization detection sensor 26_V in a light exposure device 11B is arranged at a position where it is possible to detect laser light beams 14BK and 14Y similarly to the light exposure device 11, and however, the position of such arrangement is different from that of the light exposure device 11. Also, the light exposure device 11B is different from the light exposure device 11 in that folding mirrors for synchronization detection 25M_Y1 and 25M_Y2 are eliminated. This is because the synchronization detection sensor 26_V is arranged at a position where the laser light beam 14Y is incident via a folding mirror for synchronization detection 25M_Y3, and accordingly, the folding mirrors for synchronization detection 25M_Y1 and 25M_Y2 are not necessarily required.

In the light exposure device 11B, the synchronization detection sensor 26_V detects the laser light beam 14BK after passing through the folding mirror 25M_BK and the laser light beam 14Y after passing through a folding mirror 25M_Y for each scanning operation of one line and adjusts the timing of start of light exposure at the time of image formation. The laser light beam 14Y is incident on synchronization detection sensors 26_V and 26_S1 via the folding mirror for synchronization detection 25M_Y3. An optical path on which the laser light beam 14Y is incident on the synchronization detection sensor 26_V is common to an optical path on which the laser light beam 14Y is incident on the synchronization detection sensor 26_S1, and accordingly, it may be possible to eliminate the folding mirrors for synchronization detection 25M_Y1 and 25M_Y2 and to provide only the folding mirror for synchronization detection 25M_Y3. Thus, it may be possible to reduce the cost of the light exposure device 11B. Additionally, synchronization detection sensors 2651 and 2652 function similarly to those of the first illustrative embodiment, and hence, an explanation thereof is omitted.

In addition, FIG. 9A and FIG. 9B merely illustrate the general configuration of the synchronization detection sensors 26_V, 26_S1, and 26_S2 schematically and optical systems for guiding respective laser light beams to the synchronization detection sensors 26_V, 26_S1, and 2652 are omitted. Also, the orientations of the synchronization detection sensors 26_V, 26_S1, and 26_S2 may be different from actual ones for convenience of explanation of an optical path, and in practice, may be as described with reference to FIG. 5C. Furthermore, the positions of the synchronization detection sensors 26_V, 26_S1, and 26_S2 may be different between FIG. 9A and FIG. 9B for convenience of explanation of an optical path, and however, any arrangement is allowed as long as the synchronization detection sensors 26_V, 26_S1, and 26_S2 satisfy the above-mentioned "conditions for arrangement" and apply to the description for a component of the light exposure device 11B which is different from the light exposure device 11.

Thus, according to the third illustrative embodiment, an effect similar to that of the first illustrative embodiment may be provided and the following effect may be further provided. That is, an optical path on which a laser light beam 14Y is incident on a synchronization detection sensor 26_V is common to an optical path on which the laser light beam 14Y is incident on a synchronization detection sensor 26_S1, and accordingly, it may be possible to eliminate folding mirrors for synchronization detection 25M_Y1 and 25M_Y2 and to reduce the cost of a light exposure device 11B.

Additionally, an example of an image forming apparatus including an intermediate transfer belt has been described in each illustrative embodiment described above, and however, a conveyor belt may be used instead of the intermediate transfer belt in the case of a direct-transfer-type image forming apparatus.

<An Illustrative Embodiment(s) of a Positional Displacement Correcting Device and an Image Forming Apparatus Equipped with the Same>

At least one illustrative embodiment of the present invention may relates to a positional displacement correcting device for overlaying a plurality of colors at an identical position and an image forming apparatus using the same.

An object of at least one illustrative embodiment of the present invention may be to provide a positional displacement correcting device capable of suppressing an increase in a manufacturing cost and calculating an amount of positional displacement of light exposure correctly even when deformation of a light exposure device is caused and an image forming apparatus equipped with the same.

Illustrative embodiment (1) is a positional displacement correcting device including:

an endless conveyor conducting conveyance in a first direction;

a plurality of image carriers for forming an image of each color to be transferred onto the endless conveyor;

a plurality of image forming devices for developing electrostatic latent images with developers of colors different from one another at respective image carriers and transferring developer images onto the endless conveyor;

an image-making positional displacement amount calculating device for calculating amounts of image-making positional displacement in the first direction and a second direction orthogonal to the first direction for an image of each color transferred onto the endless conveyor by using a pattern for positional displacement correction image-made on the endless conveyor;

a light exposure device for scanning the plurality of image carriers with a light beam(s) and exposing the plurality of image carriers to light, which is configured to include inside a housing:

a plurality of light sources;
a scanning device for rotating to conduct scanning with a plurality of light beams emitted from the plurality of light sources in the second direction;
a plurality of light path changing devices arranged in a light path between the scanning device and each image carrier to change respective light paths of the plurality of light beams for scanning by the scanning device to a direction of a face of a corresponding image carrier which face is subjected to transfer,
a first light detecting device arranged in a light path between the scanning device and at least one of the plurality of image carriers and having a light receiving face perpendicular to the second direction; and
a second light detecting device arranged in a light path between at least one of the plurality of light path changing devices and at least one of the plurality of image carriers and having a light receiving face non-parallel to the light receiving face of the first light detecting device;

a third light detecting device arranged outside the housing and having a light receiving face non-parallel to the light receiving face of the first light detecting device;

a light exposure positional displacement amount calculating device for measuring a first scanning time period from when the first light detecting device detects at least one of the plurality of light beams for scanning in the scanning device until when the second light detecting device detects at least one of the plurality of light beams for scanning in the scanning device and calculating an amount of positional displacement of light exposure based on the measured first scanning time period; and a scanning time period measuring device for measuring a second scanning time period from when the second light detecting device detects at least one of the plurality of light beams for scanning in the scanning device until when the third light detecting device detects a light beam identical to a light beam detected by the second light detecting device, wherein:

timing for conducting calculation of an amount of image-making positional displacement by the image-making positional displacement amount calculating device is determined based on a result of measurement by the scanning time period measuring device, and timing of light exposure with light beams for forming the electrostatic latent images of respective colors is adjusted based on results of calculations by the light exposure positional displacement amount calculating device and the image-making positional displacement amount calculating device, whereby positions of image-making of the developer images are adjusted.

Illustrative embodiment (2) is the positional displacement correcting device as described in illustrative embodiment (1), wherein the second light detecting device detects a light beam different from a light beam detected by the first light detecting device among the plurality of light beams.

Illustrative embodiment (3) is the positional displacement correcting device as described in illustrative embodiment (1) or (2), wherein the second light detecting device detects a light beam whose light path is changed by a light path changing device arranged nearest the scanning device among the plurality of light path changing devices.

Illustrative embodiment (4) is the positional displacement correcting device as described in any one of illustrative embodiments (1) to (3), wherein the light exposure positional displacement amount calculating device calculates an amount of positional displacement of light exposure with respect to a color for a light beam that is not detected by the second light detecting device, based on the measured first scanning time period.

Illustrative embodiment (5) is the positional displacement correcting device as described in any one of illustrative embodiments (1) to (4), wherein the light exposure positional displacement amount calculating device provides an amount of positional displacement of light exposure as a value of the measured first scanning time period multiplied by a predetermined factor.

Illustrative embodiment (6) is the positional displacement correcting device as described in illustrative embodiment (5), further including a positional displacement correcting pattern image forming device for image-forming a pattern for positional displacement correction on the endless conveyor in the first direction, wherein the predetermined factor is calculated by the light exposure positional displacement amount calculating device based on a result provided by calculating an amount of positional displacement of light exposure when the positional displacement correcting pattern image forming device image-forms the pattern for positional displacement correction and comparing the calculated amount of positional displacement of light exposure with an amount of image-making positional displacement calculated by the image-making positional displacement amount calculating device.

Illustrative embodiment (7) is the positional displacement correcting device as described in illustrative embodiment (5), wherein the predetermined factor is calculated by the light exposure positional displacement amount calculating device based on a result of detection of a last pattern for positional displacement correction.

Illustrative embodiment (8) is the positional displacement correcting device as described in illustrative embodiment (5), wherein the predetermined factor is calculated while the light exposure positional displacement amount calculating device averages a predetermined factor calculated based on a result of detection of a last pattern for positional displacement correction and a predetermined factor calculated based on a result of detection of a preceding pattern for positional displacement correction.

Illustrative embodiment (9) is the positional displacement correcting device as described in illustrative embodiment (5), wherein the predetermined factor is calculated by the light exposure positional displacement amount calculating device when an amount of positional displacement calculated based on a result of detection of a last pattern for positional displacement correction is equal to or more than a predetermined threshold value.

Illustrative embodiment (10) is the positional displacement correcting device as described in illustrative embodiment (5), wherein the predetermined is calculated by the light exposure positional displacement amount calculating device based on a result of detection of a last pattern for positional displacement correction when an average rotational speed of the scanning device during a time period between a time point of image-making of a last pattern for positional displacement correction and a time point of image-making of an immediately preceding pattern for positional displacement correction is calculated and the average rotational speed is equal to or more than a predetermined threshold value.

Illustrative embodiment (11) is the positional displacement correcting device as described in illustrative embodiment (5),
further including a temperature detecting device for measuring an ambient temperature for the scanning device,
wherein the temperature detecting device calculates a change in an ambient temperature for the scanning device during a time period between a time point of image-making of a last pattern for positional displacement correction and a time point of image-making of an immediately preceding pattern for positional displacement correction, and
the predetermined factor is calculated by the light exposure positional displacement amount calculating device based on a result of detection of a last pattern for positional displacement correction when the change in the temperature is equal to or more than a predetermined threshold value.

Illustrative embodiment (12) is an image forming apparatus including the positional displacement correcting device as described in any one of illustrative embodiments (1) to (11).

According to at least one illustrative embodiment of the present invention, it may be possible to provide a positional displacement correcting device capable of suppressing an increase in a manufacturing cost and calculating an amount of positional displacement of light exposure correctly even when deformation of a light exposure device is caused and an image forming apparatus equipped with the same.

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of its priority based on Japanese patent application No. 2010-060193 filed on Mar. 17, 2010, the entire content of which is hereby incorporated by reference herein.

What is claimed is:
1. An image forming apparatus, comprising:
an image conveyor;
plural photoconductor bodies;
a light exposure device configured to expose the plural photoconductor bodies to plural light beams to form plural electrostatic latent images on the plural photoconductor bodies;
a development device configured to develop the plural electrostatic latent images with developers to form plural images;
a transfer device configured to transfer the plural images onto the image conveyor; and
a pattern detection device configured to detect a pattern for correcting positional displacement of the plural images to be transferred onto the image conveyor;
wherein the light exposure device includes:
an optical scanning part configured to scan the plural photoconductor bodies with the plural light beams in a first direction;
a first light detection part having a first light receiving face configured to detect at least one of the plural light beams and be perpendicular to the first direction;
a second light detection part having a second light receiving face configured to detect at least one of the plural light beams and be non-parallel to the first light receiving face;
a third light detection part having a third light receiving face configured to detect at least one of the plural light beams and be non-parallel to the first light receiving face;
the optical scanning part, the first light detection part, and the second light detection part being provided inside a housing of the light exposure device;
the third light detection part being provided outside the housing; and
a light exposure timing control device configured to calculate a first set of amounts of positional displacement of the plural images to be transferred onto the image conveyor based on detection of the pattern, measure a first time period between detection of at least one of the plural light beams on the first light receiving face and detection of at least one of the plural light beams on the second light receiving face, calculate a second set of amounts of positional displacement of the plural images to be transferred onto the image conveyor based on the first time period, measure a second time period between detection of at least one of the plural light beams on the second light receiving face and detection of at least one of the plural light beams on the third light receiving face, determine timing of calculation of the first sets of amounts of positional displacement of the plural images based on the second time period, and control timing of light exposure of the plural photoconductor bodied to the plural light beams based on the first set of amounts of positional displacement of the plural images and the second sets of amounts of positional displacement of the plural images.
2. The image forming apparatus as claimed in claim 1, wherein the first light detection part and the second light detection part are arranged in such a manner that the at least one of the plural light beams to be detected on the first light receiving face is different from the at least one of the plural light beams to be detected on the second light receiving face.

3. The image forming apparatus as claimed in claim 1, wherein the light exposure device includes plural mirrors configured to direct the plural light beams to the plural photoconductor bodies and the second light detection part is arranged in such a manner that the at least one of the plural light beams to be detected on the second light receiving face is a light beam to be directed by a mirror closest to the optical scanning part among the plural mirrors.

4. The image forming apparatus as claimed in claim 1, wherein the optical scanning part includes a rotating mirror.

5. The image forming apparatus as claimed in claim 1, wherein the light exposure device includes a temperature detection part configured to detect temperature around the optical scanning part.

* * * * *